US011949171B2

(12) United States Patent
Wang et al.

(10) Patent No.: US 11,949,171 B2
(45) Date of Patent: Apr. 2, 2024

(54) WIRELESS COMMUNICATION SYSTEMS HAVING PATCH-TYPE ANTENNA ARRAYS THEREIN THAT SUPPORT WIDE BANDWIDTH OPERATION

(71) Applicant: CommScope Technologies LLC, Hickory, NC (US)

(72) Inventors: Huan Wang, Richardson, TX (US); Joachim Griessmeier, Polsingen (DE); Andreas Rosenwirth, Donauwörth (DE)

(73) Assignee: CommScope Technologies LLC, Claremont, NC (US)

( * ) Notice: Subject to any disclaimer, the term of this patent is extended or adjusted under 35 U.S.C. 154(b) by 108 days.

(21) Appl. No.: 17/672,962

(22) Filed: Feb. 16, 2022

(65) Prior Publication Data

US 2022/0278456 A1 Sep. 1, 2022

Related U.S. Application Data

(60) Provisional application No. 63/165,932, filed on Mar. 25, 2021, provisional application No. 63/155,014, filed on Mar. 1, 2021.

(51) Int. Cl.
*H01Q 9/04* (2006.01)
*H01Q 13/18* (2006.01)

(52) U.S. Cl.
CPC ........... *H01Q 9/0407* (2013.01); *H01Q 13/18* (2013.01)

(58) Field of Classification Search
CPC . H01Q 9/0407; H01Q 9/0414; H01Q 1/38–48
See application file for complete search history.

(56) References Cited

U.S. PATENT DOCUMENTS 7,283,101 B2 10/2007 Bisiules et al.
2011/0199279 A1* 8/2011 Shen .................... H01Q 9/0414
343/700 MS (Continued)

FOREIGN PATENT DOCUMENTS

CN 109980351 A 7/2019
CN 111180878 A 5/2020

(Continued)

OTHER PUBLICATIONS

Notification of Transmittal of the International Search Report and the Written Opinion of the International Searching Authority, or the Declaration, in corresponding PCT Application No. PCT/US2022/017888 (dated Jun. 17, 2022).

(Continued)

*Primary Examiner* — Hasan Islam
(74) *Attorney, Agent, or Firm* — Myers Bigel, P.A.

(57) ABSTRACT

An antenna includes a cross-polarized feed signal network configured to convert first and second radio frequency (RF) input feed signals into first and second pairs of cross-polarized feed signals at respective first and second pairs of feed signal output ports. A patch carrier is provided on the cross-polarized feed signal network. The patch carrier includes a substrate having a plurality of cavities therein, and first and second pairs of feed signal lines, which are electrically coupled to the first and second pairs of feed signal output ports and extend on sidewalls of the plurality of cavities. A patch radiating element is provided on the patch carrier. The patch radiating element is capacitively coupled to the first and second pairs of feed signal lines.

20 Claims, 22 Drawing Sheets

(56) References Cited

U.S. PATENT DOCUMENTS

| | | | | |
|---|---|---|---|---|
| 2015/0194730 | A1* | 7/2015 | Sudo | H01Q 5/378 343/905 |
| 2020/0373675 | A1 | 11/2020 | Ahmed et al. | |
| 2021/0384616 | A1 | 12/2021 | Patel et al. | |

FOREIGN PATENT DOCUMENTS

| | | | |
|---|---|---|---|
| EP | 2955845 | A1 | 12/2015 |
| WO | 2020242783 | A2 | 12/2020 |

OTHER PUBLICATIONS

Hung et al. "Dimension Optimization on Mutual Coupling Reduction Between Two L-shaped Folded Monopole Antennas for Handset Using PSO" 6th European Conf. On Antennas and Propagation (EUCAP) (pp. 1925-1928) (2011).

Sevskiy et al. "Air-Filled Stacked-Patch Antenna" (4 pages) (Jan. 2003).

Yang et al. "A Wide-Angle E-Plane Scanning Linear Array Antenna with Wide Beam Elements" IEEE Antennas and Wireless Propagation Letters 16:2923-2926 (2017).

Yang et al. "Study on Wide-Angle Scanning Linear Phased Array Antenna" IEEE Trans. on Antennas and Propagation 66(1):450-455 (Jan. 2018).

* cited by examiner

WIRELESS COMMUNICATION SYSTEMS HAVING PATCH-TYPE ANTENNA ARRAYS THEREIN THAT SUPPORT WIDE BANDWIDTH OPERATION

CROSS-REFERENCE TO RELATED APPLICATION

This application claims priority to U.S. Provisional Patent Application No. 63/155,014, filed Mar. 1, 2021, and U.S. Provisional Patent Application No. 63/165,932, filed Mar. 25, 2021, the disclosures of which are hereby incorporated herein by reference. This application is related to PCT/US2020/033016, filed May 15, 2020, entitled "Wireless Communication Systems Having Patch-Type Antenna Arrays Therein that Support Large Scan Angle Radiation," the disclosure of which is hereby incorporated herein by reference.

FIELD OF THE INVENTION

The present invention relates to antenna devices and, more particularly, to patch-type radiating elements and antenna arrays for wireless communication systems

BACKGROUND

Multi-input multi-output (MIMO) and beamforming technologies are widely used in modern base station antennas to enhance wireless capacity and speed in various RF communication systems. However, the relatively large size of the antenna radiators and arrays, RF filters, multiplexers, thermal blades and ventilation structures are often the biggest adders of system weight and volume, as compared to the active integrated circuits. Moreover, efforts to reduce the size and weight of antenna radiators can increase the Q factor and reduce the operational bandwidth of the antennas. As will be understood by those skilled in the art, the bandwidth of an antenna is restricted by:

$$B \leq \frac{1}{Q}\frac{\pi}{\ln\left(\frac{1}{\Gamma_{max}}\right)},$$

$$Q_{min} = \frac{1}{ka} + \frac{1}{n(ka)^3}.$$

where Q/Qmin is the quality factor, k is the wave number, a is the radius of a sphere that circumscribes the antenna, n is either 1 or 2 depending on the number of the modes contained within the antenna, B is the available bandwidth, and Emax is the maximum allowable reflection coefficient of the circuit composed of the antenna and its passive matching elements.

One example of a MIMO antenna, which is disclosed in an article by N. Hung et al., entitled "*Dimension Optimization on Mutual Coupling Reduction Between Two L-shaped Folded Monopole Antennas for Handset Using PSO,*" $6^{th}$ European Conf. On Antennas and Propagation (EUCAP), pp. 1925-1928 (2011), includes a L-shaped folded monopole antenna (LFMA) for use in small cell systems. Such small cell systems can be used to provide in-building and outdoor wireless service with lower cost and lower power consumption, as compared to macro cells. Unfortunately, such LFMA antennas may only provide limited bandwidth operation, such as a −4 dB return loss (RL) fractional bandwidth of less than about 5%.

In contrast, air-filled patch antennas as well as multi-layer patch antennas often have relatively broad bandwidths relative to single-layer patch antennas with solid substrates, but typically suffer from higher cost and structural instability. One example of a multi-layer air-filled patch antenna defined by a micro-strip annular ring is disclosed at FIGS. 2*a*-2*c* of commonly assigned U.S. Pat. No. 7,283,101 to Bisiules et al., the disclosure of which is hereby incorporated herein by reference. Another example of an multi-layer air-filled patch antenna is disclosed in an article by S. Sevskiy et al., entitled "*Air-Filled Stacked-Patch Antenna*," (see, e.g., http://hft.uni-duisburg-essen.de/INICA2007/2003/archive/inica_2003/2.2_Sevskiy.PDF). Unfortunately, this stacked patch antenna may suffer from relatively high cost, large aperture and height and relatively narrow beamwidth.

In addition, a wide-angle scanning linear array antenna is disclosed in an article by G. Yang et al., entitled "*Study on Wide-Angle Scanning Linear Phased Array Antenna*," IEEE Trans. on Antennas and Propagation, Vol. 66, No. 1, January 2018, pp. 450-455. As illustrated by FIG. 1 of Yang et al., a relatively wide beamwidth antenna may include a driving microstrip antenna with electric walls over a ground plane. Based on this configuration, a horizontal current of the microstrip antenna is produced on a radiating patch, whereas a vertical current is induced on the electric walls by the E-fields of the microstrip antenna. As will be understood by those skilled in the art, the vertical metallic walls help to support relatively wide beamwidths and relatively large scan angles for an array, however, only single polarization radiation is possible. These characteristics of a phase array antenna are also disclosed in an article by G. Yang et al., entitled "*A Wide-Angle E-Plane Scanning Linear Array Antenna with Wide Beam Elements*," IEEE Antennas and Wireless Propagation Letters, Vol. 16, (2017), pp. 2923-2926.

SUMMARY OF THE INVENTION

Antenna arrays according to embodiments of the invention utilize reduced-size patch-type radiators to support wider scan angles and wider beamwidths. In some of these embodiments, an antenna is provided that includes a cross-polarized feed signal network, a patch carrier on the cross-polarized feed signal network, and a patch radiating element on the patch carrier. The cross-polarized feed signal network is configured to convert first and second radio frequency (RF) input feed signals into first and second pairs of cross-polarized feed signals at respective first and second pairs of feed signal output ports. The patch carrier includes a substrate (e.g., polyphenylene ether (PPE)) having a plurality of cavities therein, and first and second pairs of feed signal lines, which extend on sidewalls of the plurality of cavities and electrically contact (or capacitively couple to) the first and second pairs of feed signal output ports. Distal ends of the first and second pairs of feed signal lines (within the patch carrier) are capacitively coupled to the patch radiating element.

In some of these embodiments of the invention, the plurality of cavities may include: (i) a first pair of cavities having first and second open ends on respective first and second opposing sides of the substrate, and (ii) a second pair of cavities having third and fourth open ends on respective third and fourth opposing sides of the substrate. The substrate may also be a rectangular-shaped substrate, and the first through fourth open ends may be located at respective first through fourth corners of the substrate. In some embodiments, the first pair of cavities may extend inwardly from diametrically opposite corners of the substrate and terminate at a first pair of innermost sidewalls. Similarly, the second pair of cavities may extend inwardly from diametrically opposite corners of the substrate and terminate at a second pair of innermost sidewalls. The first pair of innermost sidewalls may be aligned back-to-back and the second pair of innermost sidewalls may be aligned back-to-back. Moreover, the first and second pairs of feed signal lines may extend on these innermost sidewalls, and the patch radiating element may be capacitively coupled to distal ends of these first and second pairs of feed signal lines. The distal ends of the first and second pairs of feed signal lines may be semi-circular in shape, and may extend on corresponding ceilings within the first and second pairs of cavities and parallel to the patch radiating element.

According to further embodiments of the invention, the cross-polarized feed signal network includes a multi-layered printed circuit board (PCB) having an intermediate layer therein, which extends between first and second ground plane layers. This intermediate layer defines a feed signal routing circuit that converts the first and second RF input feed signals into the first and second pairs of cross-polarized feed signals. Preferably, this feed signal routing circuit is a strip feed line routing circuit, which includes a first LC circuit responsive to the first RF input feed signal, and a second LC circuit responsive to the second RF input feed signal. In particular, the multi-layered PCB may include first and second RF input feed signal ports, the first LC circuit may include a first inductor in series between the first RF input feed signal port and the first pair of feed signal output ports, and the second LC circuit may include a second inductor in series between the second RF input feed signal port and the second pair of feed signal output ports. The first LC circuit may also include a first capacitor having an electrode electrically coupled to a first end of the first inductor, and a second capacitor having an electrode electrically coupled to a second end of the first inductor.

In some further embodiments of the invention, the first and second RF input feed signal ports and the electrodes of the first and second capacitors are sandwiched between the first and second ground plane layers, whereas the first and second pairs of feed signal output ports are coplanar with the first ground plane layer, which is located on a forward-facing surface of the multi-layered PCB. In addition, an RF connector is provided adjacent a rear-facing surface of the multi-layered PCB. This RF connector includes a first feed conductor electrically coupled by a plated through-hole within the multi-layered PCB to the first RF input feed signal port, and at least one outer conductor pin electrically coupled to the first and second ground plane layers. In some embodiments, this at least one outer conductor includes a plurality of outer conductor pins, which are embedded into the multi-layered PCB and electrically connected to the first and second ground plane layers.

According to additional embodiments of the invention, an antenna is provided, which includes a patch carrier having a plurality cavities therein with respective closed and open ends, and a plurality of feed signal lines within the plurality of cavities. A patch radiating element is provided on the patch carrier and is capacitively coupled to the plurality of feed signal lines, which may be provided on the closed ends of the plurality of cavities. For example, each of the plurality of cavities may include a ceiling upon which a distal end of a corresponding feed signal line extends (in parallel with the patch radiating element). A cross-polarized feed signal network is also provided, upon which the patch carrier extends. This cross-polarized feed signal network may include a strip feed line routing circuit embedded therein, as described hereinabove.

According to further embodiments of the invention, an antenna is provided, which includes a patch carrier having at least one cavity and a plurality of feed signal lines therein. The plurality of feed signal lines extend along respective sidewalls of the at least one cavity. A patch radiating element is provided on a forward facing surface of the patch carrier. This patch radiating element is capacitively coupled to distal ends of the plurality of feed signal lines, which extend on a ceiling(s) of the at least one cavity. The patch carrier extends on a cross-polarized feed signal network, which includes a plurality of feed signal terminals thereon. These feed signal terminals are capacitively coupled to corresponding ones of the plurality of feed signal lines. Advantageously, to provide relatively large area capacitive coupling, the plurality of feed signal terminals are serpentine-shaped, and proximal ends of the plurality of feed signal lines are similarly serpentine-shaped. In particular, the serpentine-shaped proximal ends of the plurality of feed signal lines extend on a rear facing surface of the patch carrier, and opposite the plurality of serpentine-shaped feed signal terminals, to thereby provide a solder-free radio frequency (RF) coupling therebetween.

According to still further embodiments of the invention, an antenna includes a cross-polarized feed signal network, which is configured to convert first and second radio frequency (RF) input feed signals into first and second pairs of cross-polarized feed signals at respective first and second pairs of feed signal output ports, and a feed signal pedestal that is electrically coupled to the first and second pairs of feed signal output ports. A patch-type radiating element is also provided, which is electrically coupled by the feed signal pedestal to the first and second pairs of feed signal output ports.

In some of these embodiments of the invention, the patch-type radiating element is capacitively coupled to first and second pairs of feed signal lines on the feed signal pedestal, which are directly connected to the first and second pairs of feed signal output ports. The first and second pairs of feed signal lines on the feed signal pedestal may be solder-bonded to the first and second pairs of feed signal output ports.

A ring-shaped support frame may also be provided, which extends between the patch-type radiating element and the cross-polarized feed signal network. This ring-shaped support frame may be configured to define an at least partially electromagnetically-shielded cavity that surrounds at least a portion of the feed signal pedestal. In particular, the ring-shaped support frame may include at least one of a metallized interior surface facing the feed signal pedestal and a metallized exterior surface. The cross-polarized feed signal network may also include a printed circuit board having a ground plane thereon that contacts a metallized portion of the ring-shaped support frame.

According to additional embodiments of the invention, the feed signal pedestal includes an annular-shaped polymer having a cylindrically-shaped cavity therein, and the first and second pairs of feed signal lines extend along an exterior of the annular-shaped polymer. These first and second pairs of feed signal lines may extend parallel to a longitudinal axis of the cylindrically-shaped cavity within the feed signal pedestal.

According to further embodiments of the invention, an antenna is provided, which includes a cross-polarized feed signal network configured to convert first and second radio frequency (RF) input feed signals into first and second pairs of cross-polarized feed signals at respective first and second pairs of feed signal output ports. A polymer patch carrier is also provided, which includes a patch-type radiating element on an exterior surface thereof. This patch-type radiating element may be capacitively coupled to the first and second pairs of feed signal output ports. For example, the patch carrier may include the first and second pairs of feed signal lines, and the patch-type radiating element may be capacitively coupled to arcuate-shaped distal ends of the first and second pairs of feed signal lines. A rectangular, ring-shaped, support frame may also be provided, which extends between the patch carrier and the cross-polarized feed signal network.

In still further embodiments of the invention, an antenna is provided, which includes a feed signal network, and a patch carrier having a patch-type radiating element thereon, and a feed signal pedestal. The feed signal pedestal includes first and second pairs of feed signal lines thereon, which are coupled to the patch-type radiating element and extend at least partially through an electromagnetically-shielded cavity to the feed signal network. In some of these embodiments, the patch-type radiating element extends on an exterior surface of the patch carrier, and the feed signal pedestal includes an annular-shaped polymer having a cylindrically-shaped cavity therein. The first and second pairs of feed signal lines may be solder-bonded to the feed signal network and capacitively coupled to the patch-type radiating element. Moreover, in the event the feed signal network includes a printed circuit board having a ground plane thereon, then the first and second pairs of feed signal lines may be solder-bonded to portions of the feed signal network extending within openings in the ground plane. Advantageously, the patch carrier may also include a dielectric loading extension, which extends into the electromagnetically-shielded cavity. Among other things, this dielectric loading extension can be configured to tune a center frequency of the patch-type radiating element. The feed signal pedestal may extend through an opening in the dielectric loading extension.

In addition, a ring-shaped support frame may be provided, which extends between the patch carrier and the feed signal network. This support frame may include at least one of a metallized interior surface facing the feed signal pedestal and a metallized exterior surface. In some embodiments of the invention, a height of the ring-shaped support frame may be in a range from about 0.5 times to about 1.2 times a maximum height of the electromagnetically-shielded cavity relative to the feed signal network.

According to additional embodiments of the invention, an antenna is provided, which includes: (i) a cross-polarized feed signal network, (ii) a polymer-based patch carrier having a dielectric constant equal to about 3.8 or greater at a frequency of 3 GHz, and (iii) a patch-type radiating element, which extends on the patch carrier and is electrically coupled through an electromagnetically-shielded cavity to the cross-polarized feed signal network. A polymer patch carrier support frame may also be provided, which extends between the cross-polarized feed signal network and the patch carrier. The patch carrier support frame can be ring-shaped, and at least a portion of an inner sidewall of the patch carrier support frame and/or at least a portion of an outer sidewall of the patch carrier support frame may be metallized. In addition, a portion of the patch carrier may extend into the electromagnetically-shielded cavity to thereby operate as a dielectric load on the patch-type radiating element, which can support frequency tuning.

In further embodiments of the invention, an antenna is provided with a feed signal network, and an at least partially metallized support frame is provided on the feed signal network. A patch carrier having a patch-type radiating element thereon is also provided. This radiating element is electrically coupled through a cavity in the support frame to the feed signal network. The patch carrier may contact the support frame along an entire periphery of the support frame. An interface between the patch carrier and the support frame may extend in a first plane, and the patch carrier may advantageously include a dielectric loading extension, which extends through the first plane and into the cavity to thereby support frequency tuning of the patch-type radiating element. The patch carrier may also include a feed signal pedestal, which extends entirely through the cavity and is solder bonded to portions of the feed signal network. The patch carrier, including the feed signal pedestal and the dielectric loading extension, and the support frame may be configured as metallized polymers (e.g., metallized nylon).

According to still further embodiments of the invention, a patch-type antenna array is provided, which includes: (i) a feed signal network, (ii) a multi-chambered support frame on the feed signal network, and (iii) a patch carrier having a plurality of patch-type radiating elements thereon, which are electrically coupled through respective chambers in the multi-chambered support frame to the feed signal network. In some of these embodiments of the invention, the multi-chambered support frame may include a metallized polymer having a plurality of electromagnetically-shielded cavities within the chambers (e.g., with metallized interior sidewalls). In addition, a pitch between the plurality of patch-type radiating elements may be in a range from about 0.43λ to about 0.47λ, a stack height of the patch carrier and the multi-chambered support frame may be in a range from about 0.12λ to about 0.16λ, and a diameter of the plurality of patch-type radiating elements may be in a range from about 0.23λ to about 0.27λ, where λ corresponds to a wavelength (in air) of a radio frequency (RF) signal having a frequency of 3.55 GHz.

BRIEF DESCRIPTION OF THE DRAWINGS

FIG. 10 is a graph of the gain pattern in the azimuth plane for the patch-type antenna array of FIG. 9 on a ground plane of 4.4λ×2.4λ, which illustrates a peak-gain ranging from 7.9276 dB to 11.1516 dB (i.e., a ΔGain=3.224 dB), across an operation band of 3.3 GHz to 3.8 GHz, and over a full scan range from −60° to +60° in the azimuth plane.

FIGS. 16A-160 are perspective views of elements of a patch radiating antenna with capacitive feed signal coupling, according to an embodiment of the invention.

DETAILED DESCRIPTION OF EMBODIMENTS

Figure 1A:
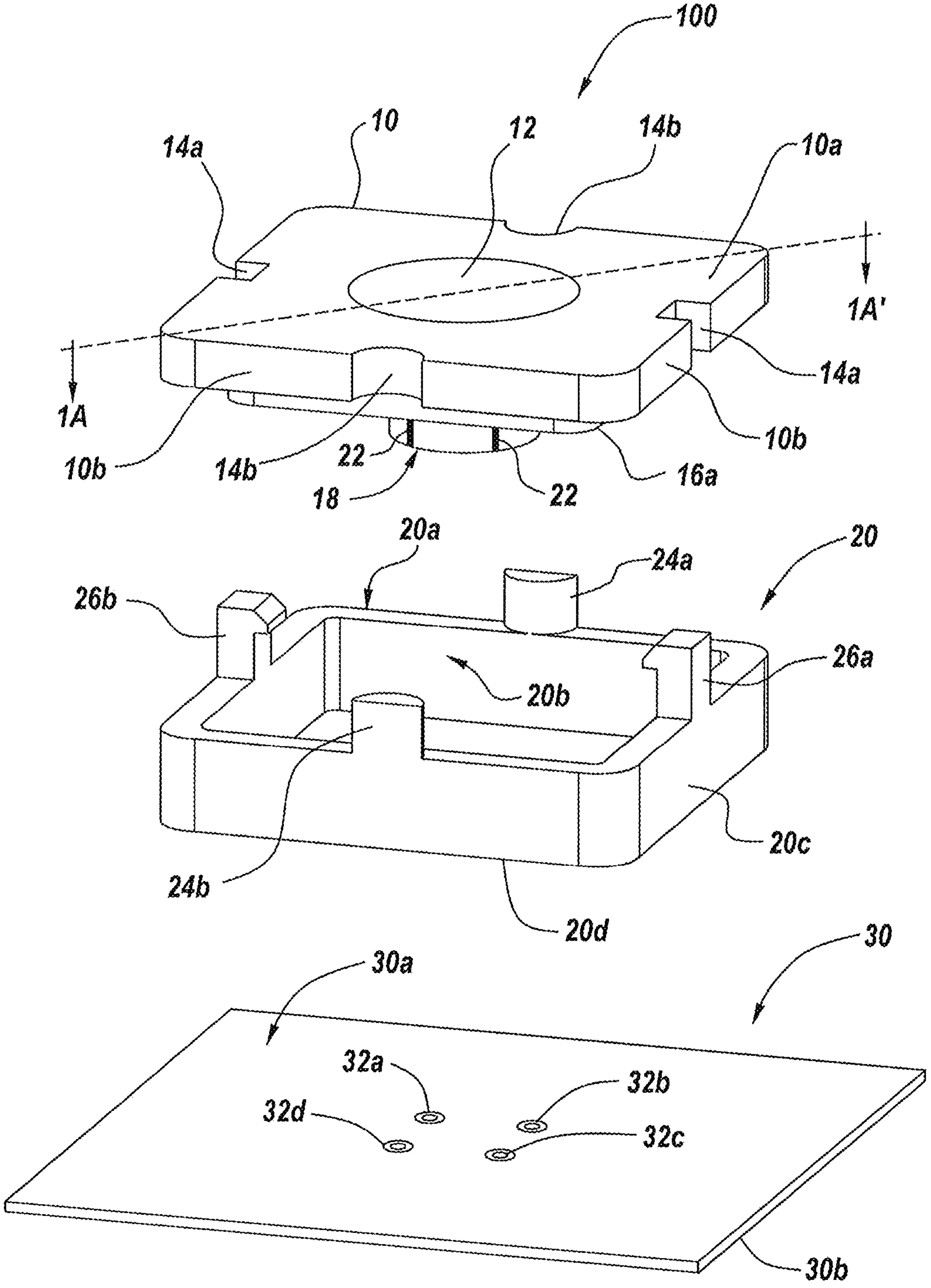
FIG. 1A is an exploded view from a side perspective of a three-piece patch-type radiating element, which includes a feed signal network, a support frame and a patch carrier (with patch) according to an embodiment of the invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
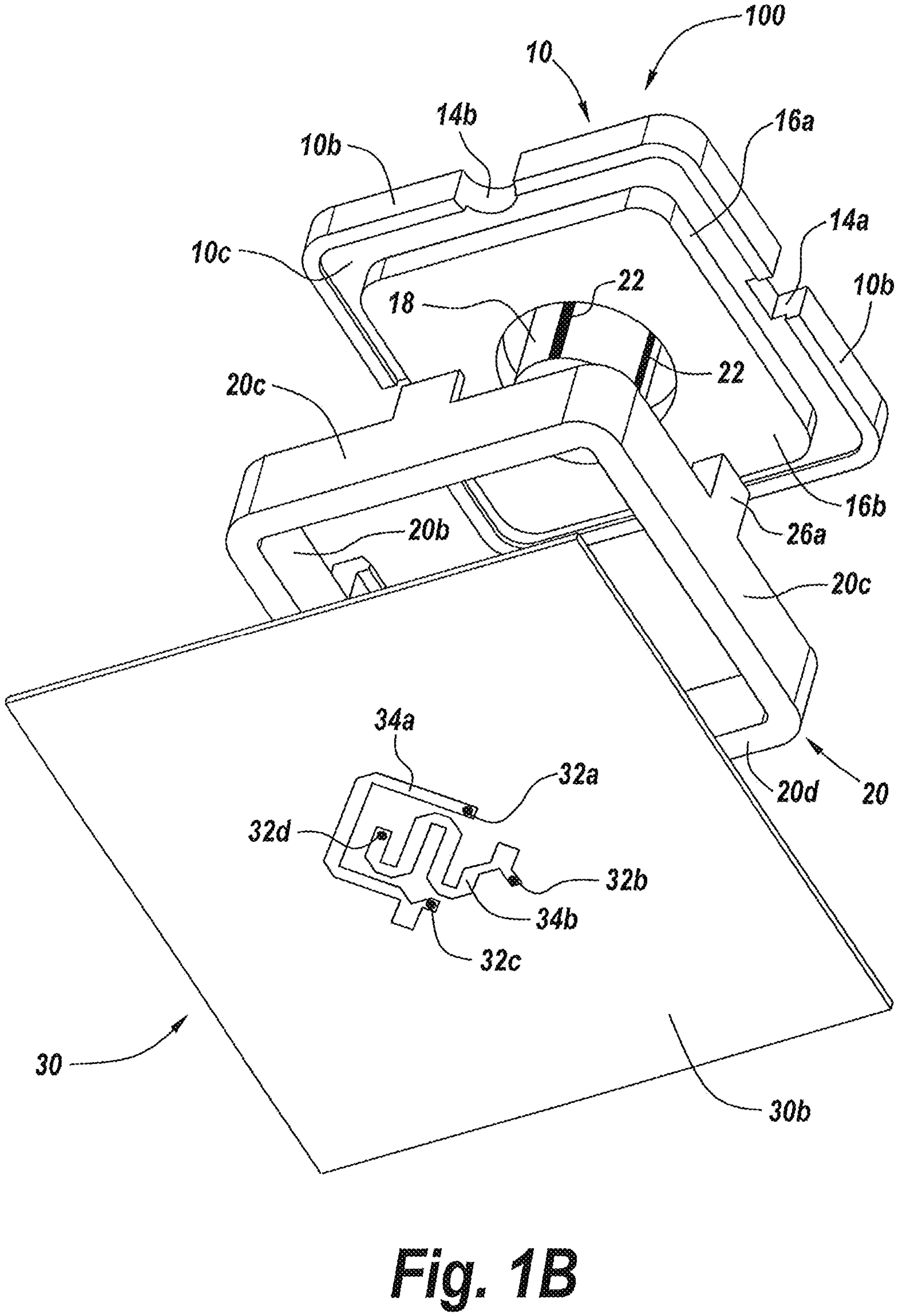
FIG. 1B is an exploded view from a rear perspective of the three-piece patch-type radiating element of FIG. 1A.
Figure 1C:
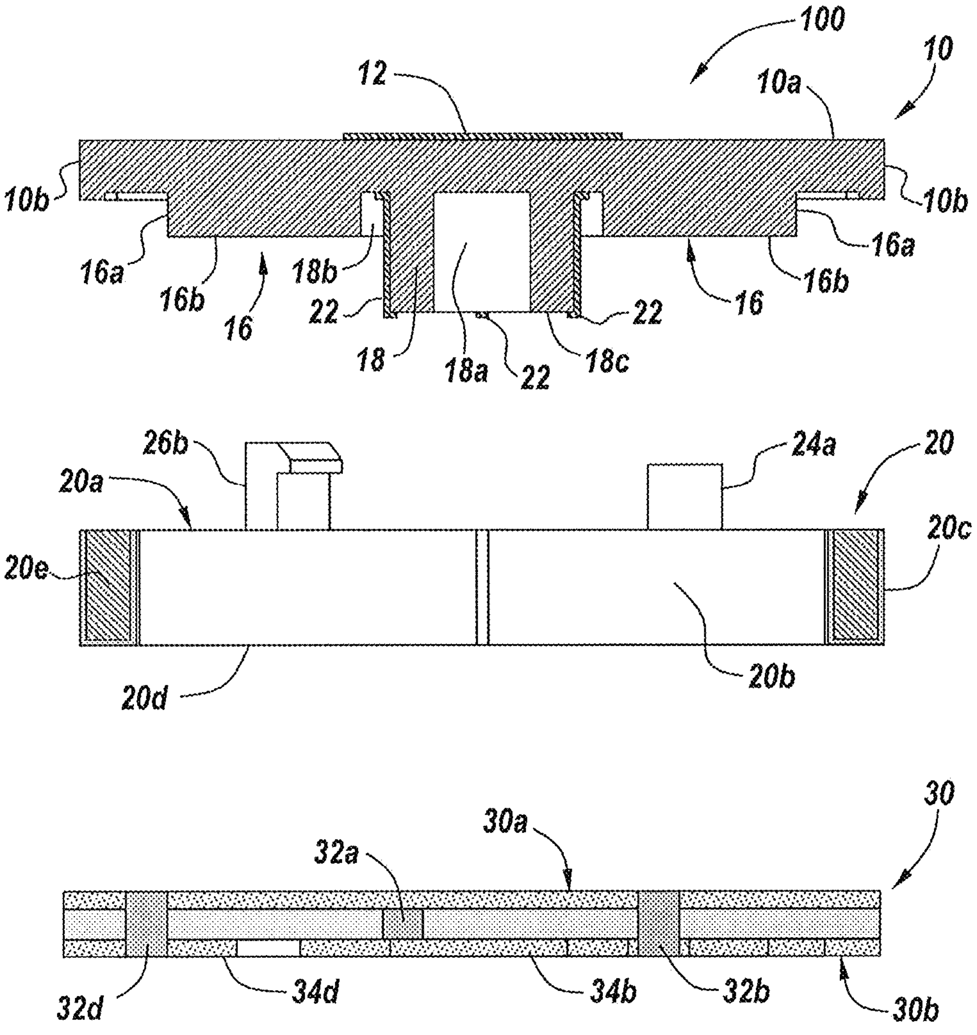

Referring now to FIGS. 1A-1C, a three-piece patch-type radiating element 100 is illustrated as including a feed signal network 30 and a rectangular-shaped polymer support frame 20 having a rear facing and preferably metallized surface 20*d*, which is disposed on the feed signal network 30. This feed signal network 30 may be provided by a dual-sided printed circuit board (PCB), which includes: (i) a mostly metallized forward-facing surface 30*a* (e.g., GND plane) configured to contact the metallized rear facing surface 20*d* of the support frame 20, and (ii) a rear-facing surface 30*b*, which includes a pair of patterned metal traces 34*a*, 34*b* (FIG. 1B) thereon. As shown, the first metal trace 34*a* is electrically coupled at first and second ends thereof to a first pair of plated through-holes 32*a*, 32*c*, whereas the second metal trace 34*b* is electrically coupled at first and second ends thereof to a second pair of plated through-holes 32*b*, 32*d*. These plated through-holes 32*a*-32*d* can be hollow or completely filled through-holes, so long as the inner sidewalls of the holes 32*a*-32*d* are sufficiently plated with a conductive skin. Nonetheless, for higher power applications, it may be advantageous to fill the through-holes to achieve better heat sink performance and/or mechanical strength. In addition, the rear facing surface 30*d* of the support frame 20 may be fixedly attached (e.g., screwed) to the forward facing surface 30*a* of the feed signal network 30, and the contact area therebetween and contact force may be advantageously controlled to inhibit passive intermodulation (PIM) distortion. Alternatively, dielectric membranes (not shown) may be utilized between the forward facing surface 30*a* and the support frame 20 to support capacitive coupling therebetween. And, in further embodiments of the invention, the support frame 20 can undergo a reflow process to thereby become a surface mount (SMT) device on the forward facing surface 30*a*.

A rectangular-shaped polymer patch carrier 10 is also provided, which can be at least partially received within and fixedly attached to the support frame 20 using, for example, alignment guides/posts 24*a*, 24*b* and snap-type clips 26*a*, 26*b* that extend into recesses 14*a*, 14*b* in the patch carrier 10 when the radiating element 100 is fully assembled. As shown, a circular metal patch 12 for radiating/receiving radio frequency (RF) signals is provided on an upper surface 10*a* of the patch carrier 10. In addition, the outer length and width dimensions of the patch carrier 10 may be sufficiently equivalent to the corresponding length and width dimensions of the support frame 20, so that: (i) the outer sidewalls 10*b* of the patch carrier 10 are generally aligned to the outer, and preferably metallized, sidewalls 20*c* of the support frame 20, and (ii) an underside ring-shaped rim 10*c* (FIG. 1B) of the patch carrier 10 contacts a corresponding forward-facing and ring-shaped surface 20*a* of the support frame 20. Neither the forward-facing and ring-shaped surface 20*a* of the support frame 20 nor the underside ring-shaped rim 10*c* of the patch carrier 10 must be metallized. However, the support frame 20 may include a metallized external sidewall 20*c* and a metallized internal sidewall 20*b*, which cover a polymer (e.g., nylon) core 20*e*. Nonetheless, the support frame 20 may be fully metallized to reduce costs and preclude the core material of the support frame 20 from materially influencing the performance characteristics of the patch-type radiating element 100.

Referring still to FIGS. 1A-1C and FIG. 3, the patch carrier 10 may include an annular-shaped feed signal pedestal 18, and a dielectric loading extension 16. This dielectric loading extension 16 is defined by an outermost sidewall 16*a* (e.g., rectangular-shaped) and has a predetermined thickness (DL) defined by a rear-facing surface 16*b*, which is exposed to an interior "electromagnetically-shielded" cavity within the rectangular support frame 20. Moreover, because the space between the metal patch 12 and the ground (GND) plane 30*a* is the space where the electromagnetic (EM) power is greatest, the air in the cavity 40 and the dielectric material (e.g., nylon) within the patch carrier 10 represent the only two materials extending between the patch 12 and the ground plane 30*a*. Accordingly, the predetermined thickness DL of the dielectric loading extension 16 may be adjusted to thereby "tune" the equivalent dielectric constant (DK) of the full space (including air) between the patch 12 and the ground plane 30*a*, but without using higher DK materials which may cause a reduction in bandwidth.

Figure 2:
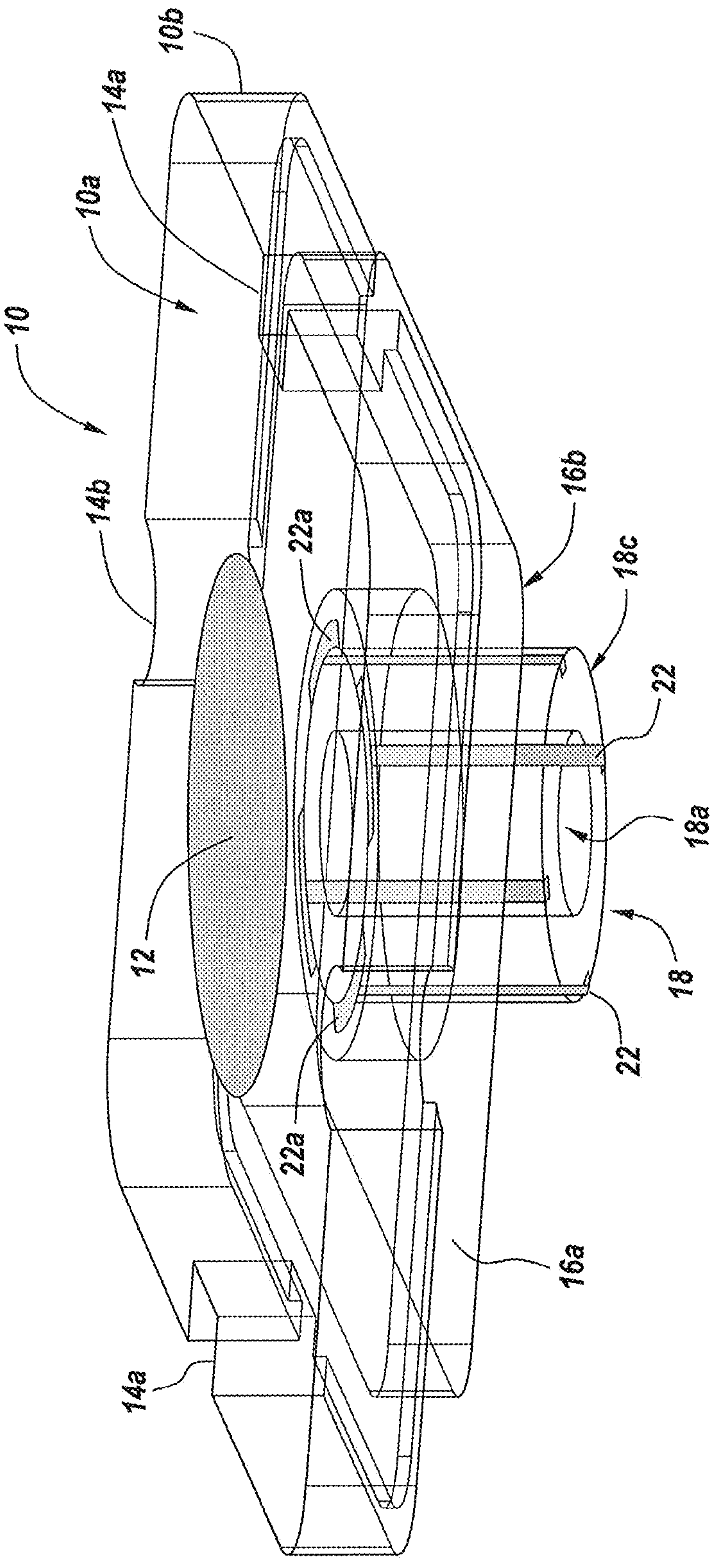
FIG. 2 is a perspective view of the patch carrier (with patch) of FIGS. 1A-1C.
Figure 3:
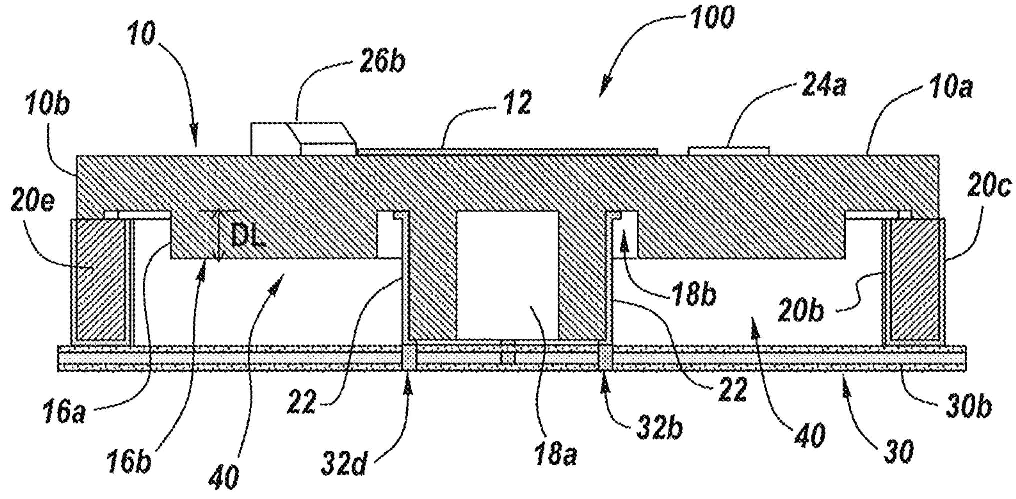
FIG. 3 is a cross-sectional side view of the three-piece patch-type radiating element of FIGS. 1A-1C, as assembled.
Figure 5:
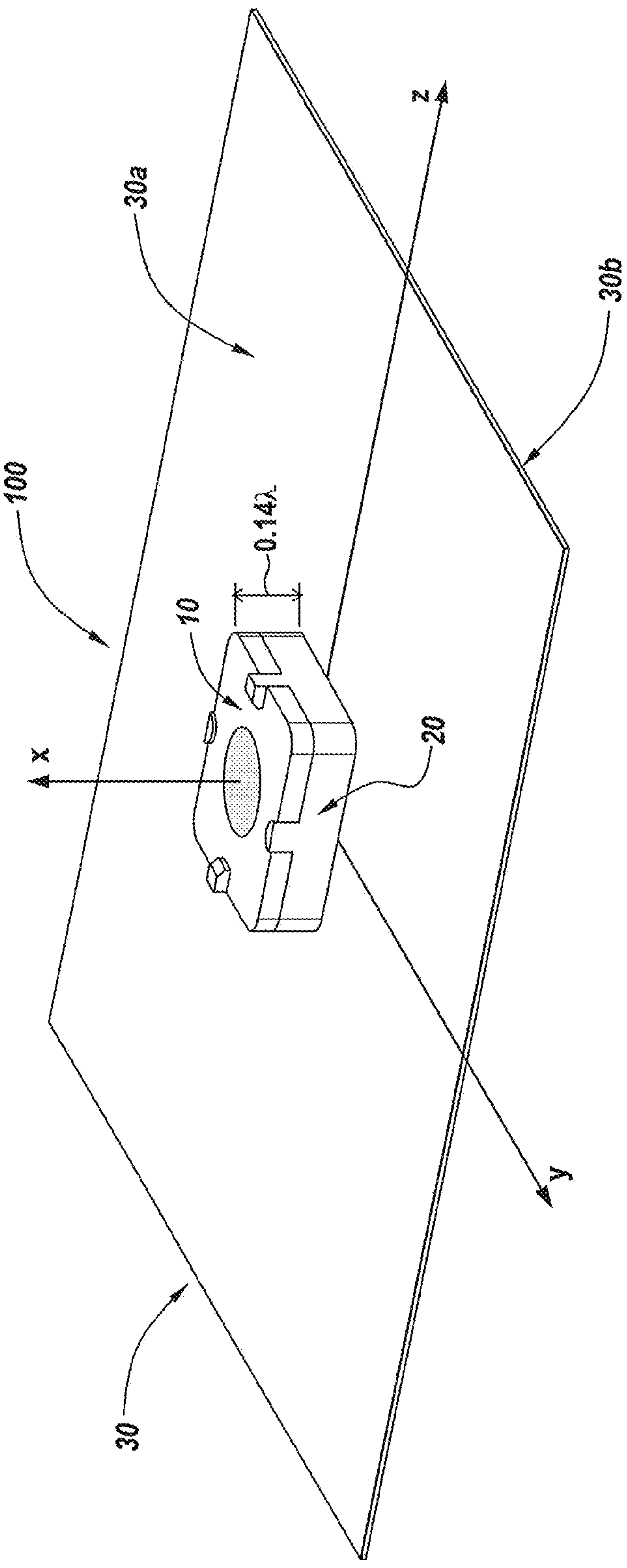
FIG. 5 is a perspective view of the three-piece patch-type radiating element of FIGS. 1A-1C, 2, 3 and 4A-4B, as assembled, where the x-z directions designate the elevation plane and the x-y directions designate the azimuth plane.

These aspects of FIGS. 1A-1C are further illustrated by the patch carrier 10 of FIG. 2 and the cross-section of the fully assembled patch-type radiating element 100 of FIG. 3, which shows the interior "electromagnetically-shielded" cavity 40 within the metallized support frame 20. In addition, FIG. 5 illustrates a perspective view of a fully assembled patch-type radiating element 100 having a stack height of 0.14λ, and metal patch diameter of 0.25λ, where λ represents the wavelength (in air) at $f_0$ (i.e., a center frequency of an operation band, such as 3.55 GHz). The polymer materials within the patch carrier 10 and support frame 20 may also be selected to have a dielectric constant of about 3.8 or greater (e.g., at a frequency of 3 GHz), such as a polyamide material (e.g., nylon).

The annular-shaped feed signal pedestal 18 is illustrated as including a cylindrically-shaped cavity/recess 18*a* therein, which has a longitudinal axis that is aligned to a center of the circular metal patch 12. In addition, a surrounding annular-shaped recess 18*b* may be provided, which extends between an inner sidewall of the dielectric loading extension 16 and an external sidewall of the feed signal pedestal 18. As shown, the external sidewall of the feed signal pedestal 18 may support two pairs of feed signal lines 22 thereon. These feed signal lines 22 extend the full height of the feed signal pedestal 18 and wrap onto a rear-facing surface 18*c* thereof, where they are solder bonded to corresponding ones of the through-holes 32*a*-32*d* within the feed signal network 30. The feed signal lines 22 also include arcuate-shaped distal ends 22*a*, which extend opposite respective portions of the circular patch 12 so that capacitive coupling is provided between each of the arcuate-shaped distal ends 22*a* of the signal lines 22 and the patch 12. As will be understood by those skilled in the art, the amount of capacitive coupling between the arcuate-shaped distal ends 22*a* of the feed signal lines 22 and the patch 12 is a function of: (i) the thickness and dielectric constant of the patch carrier material (e.g., nylon) extending between the arcuate-shaped distal ends 22*a* and the patch 12, and (ii) the area of overlap between the arcuate-shaped distal ends 22*a* and the patch 12.

Figure 4A:
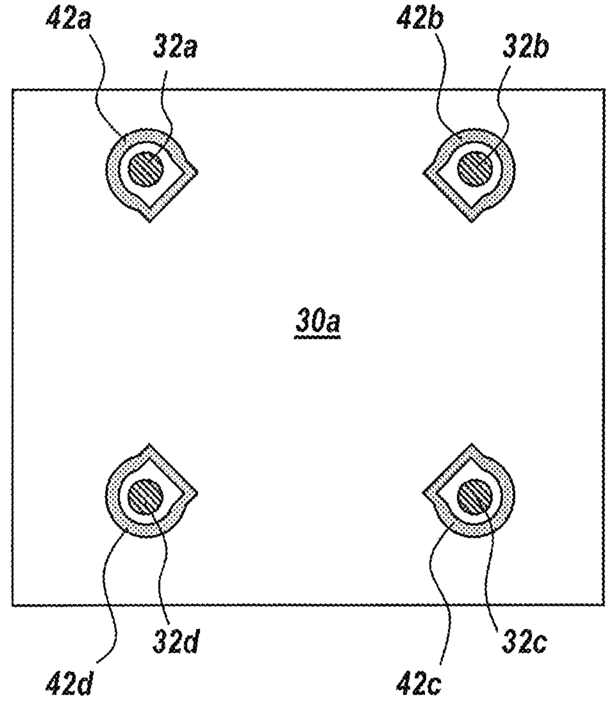
FIG. 4A is a front plan view of a portion of the feed signal network of FIGS. 1A-1C.
Figure 4B:
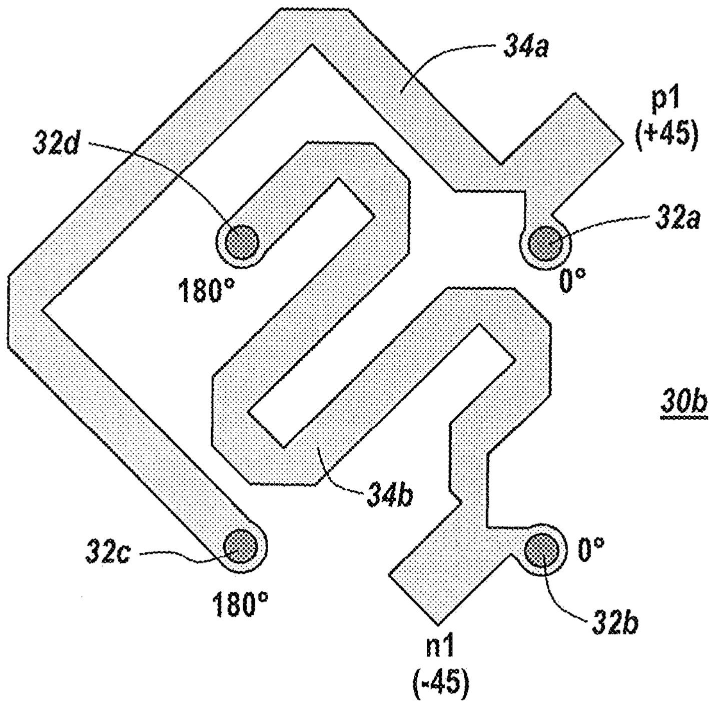
FIG. 4B is a rear plan view of a portion of the feed signal network of FIGS. 1A-1C.

Referring now to FIGS. 4A-4B, the mostly metallized forward-facing surface 30*a* of the feed signal network 30 includes a plurality of closed-loop electrical isolation regions 42*a*-42*d* (i.e., regions without metallization) surrounding respective ones of the electrically conductive through-holes 32*a*-32*d*. These through-holes extend through the PCB of the feed signal network 30 to the rear-facing surface 30*b*, which includes the first metal trace 34*a* and the second metal trace 34*b* thereon. As shown, these metal traces 34*a*, 34*b* are patterned to have respective lengths that support 0° and 180° phase delays (i.e., ½λ) to respective cross-polarized input feed signals (e.g., p1 (+45°), n1 (−45°)).

Figure 6A:
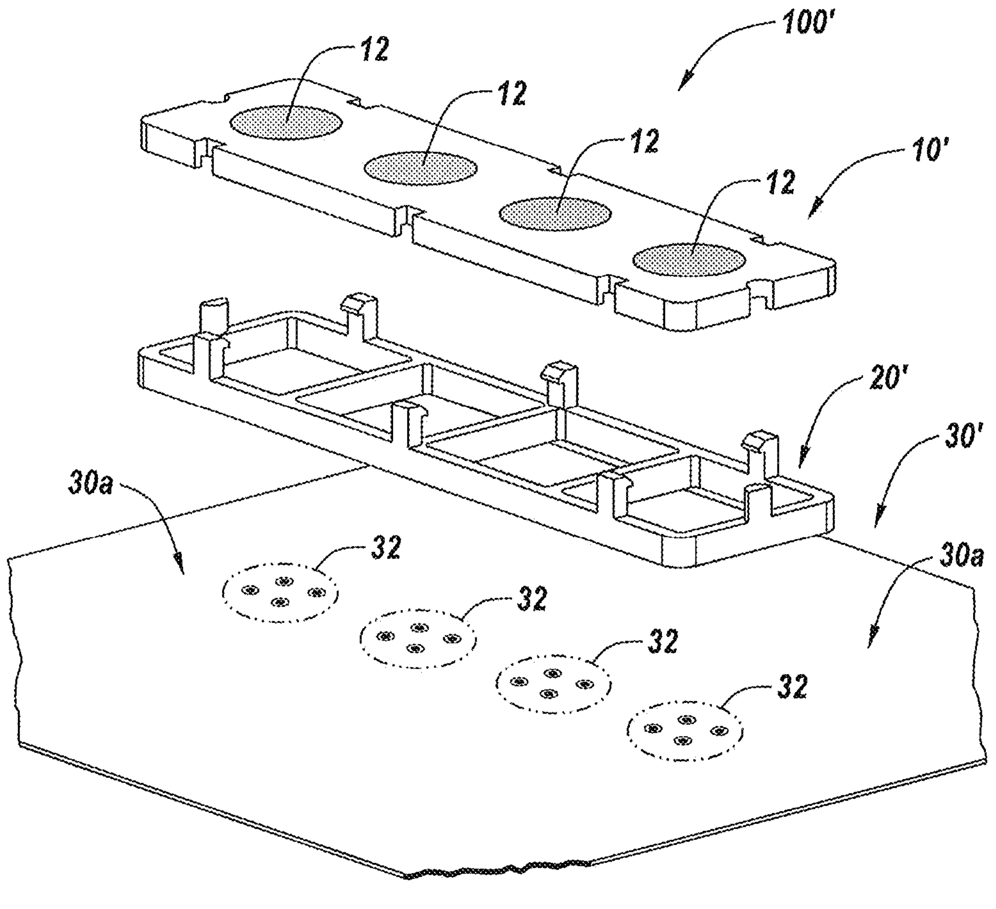
FIG. 6A is an exploded view from a side perspective of a three-piece patch-type antenna array, which includes a feed signal network, a multi-chambered support frame and a patch carrier (with a linear patch array thereon), according to an embodiment of the invention.
Figure 6B:
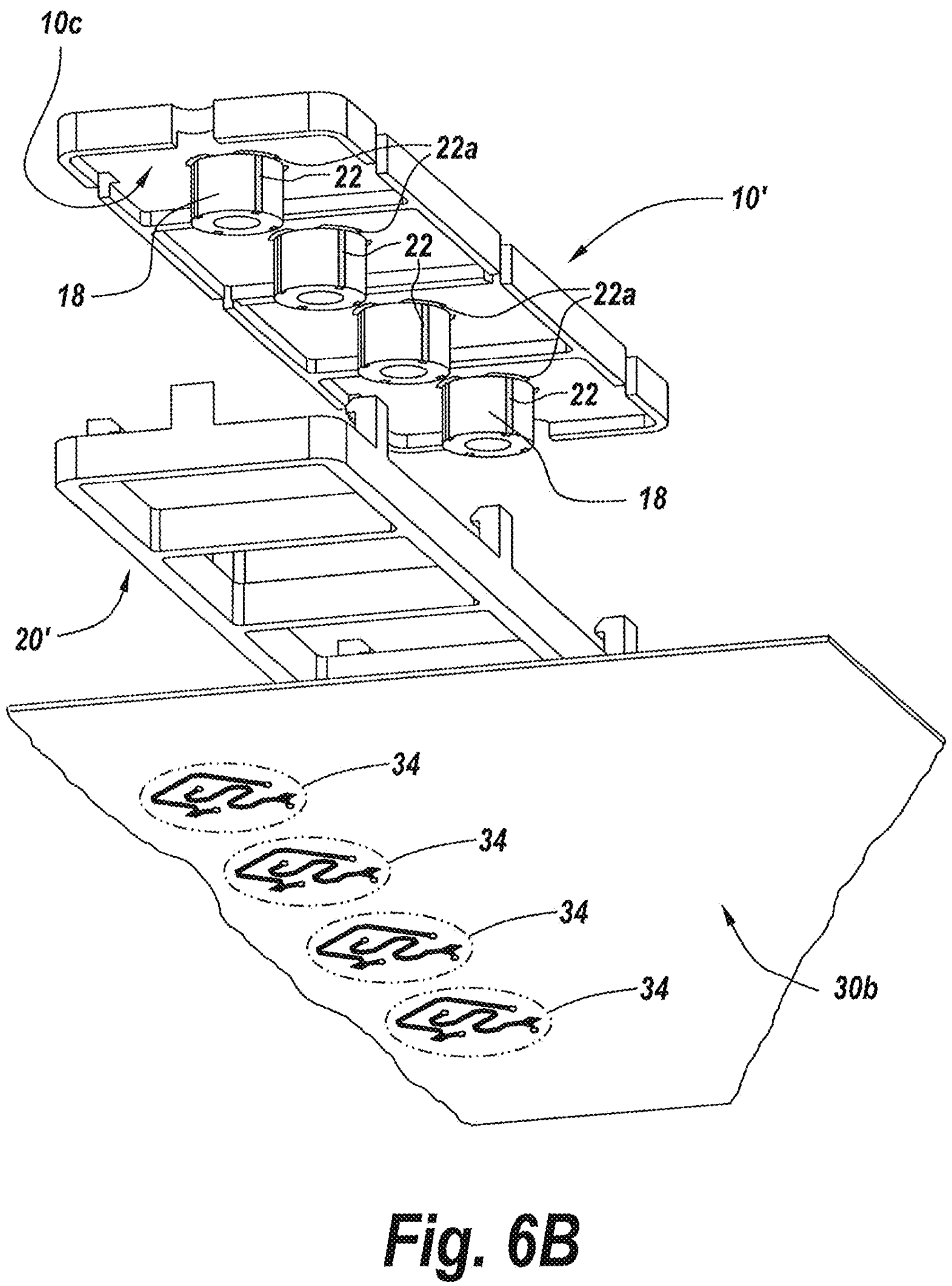
FIG. 6B is an exploded view from a rear perspective of the three-piece patch-type antenna array of FIG. 6A, according to an embodiment of the invention.
Figure 7:
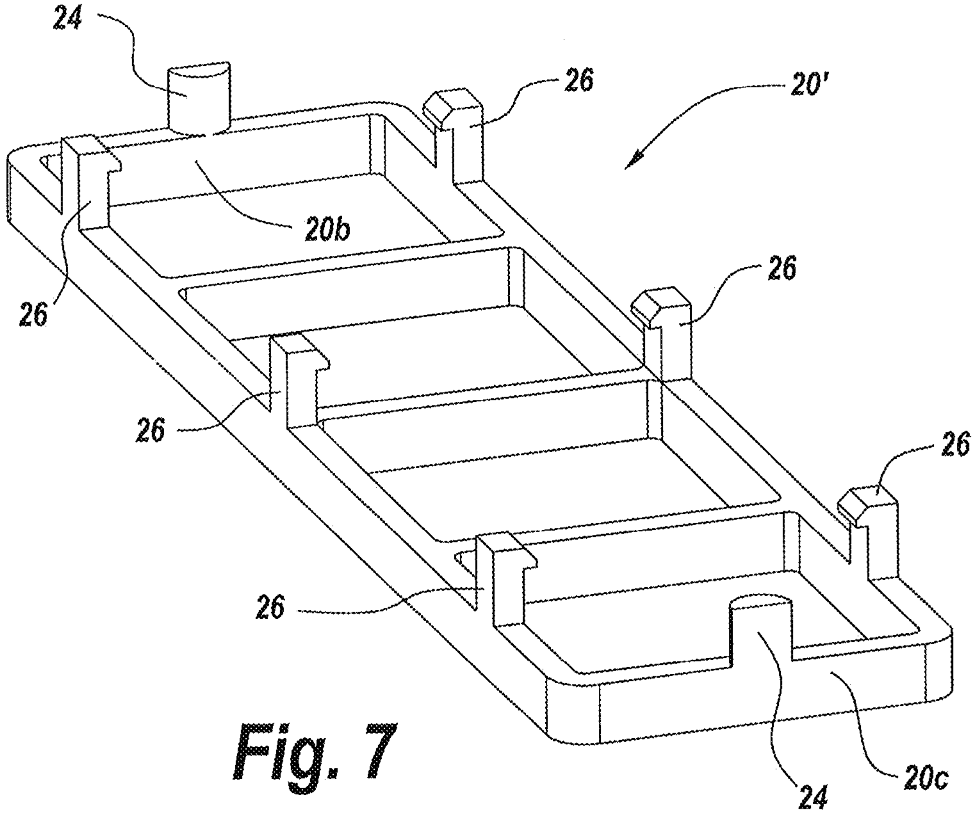
FIG. 7 is a perspective view of the multi-chambered support frame of FIGS. 6A-6B.
Figure 8:
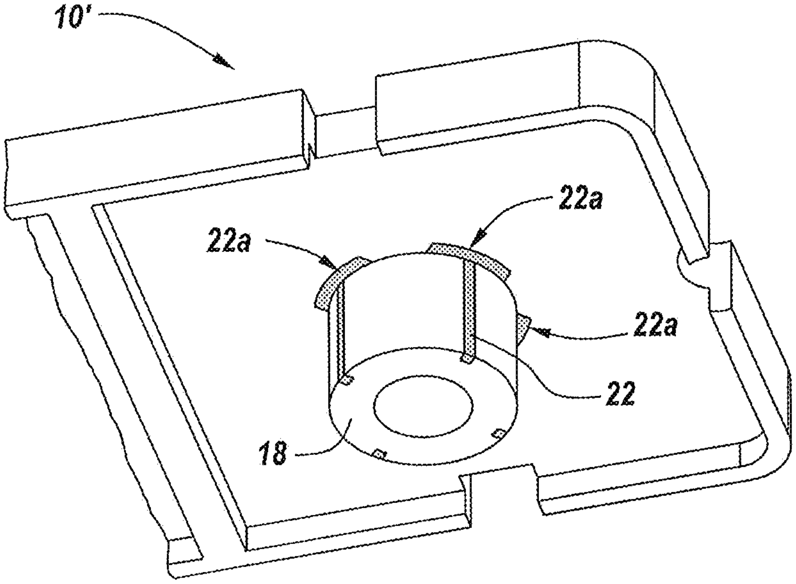
FIG. 8 is a rear perspective view of a portion of the patch carrier of FIGS. 6A-6B.

Referring now to the "exploded" side and rear perspective views of FIGS. 6A-6B and the perspective views of FIGS. 7-8, a linear patch-type antenna array 100' is illustrated as including a feed signal network 30', a multi-chambered support frame 20' with alignment posts 24 and clips 26, and an elongate patch carrier 10'. Advantageously, in some embodiments of the invention, this linear patch-type antenna array 100' may be utilized as a substitute for one or more cross-dipole radiating elements within a beam forming antenna, including the beam forming antennas disclosed in commonly assigned U.S. Provisional Application Ser. No.

62/779,468, filed Dec. 13, 2018, the disclosure of which is hereby incorporated herein by reference. In particular, the patch-type radiating elements described herein may be smaller than comparable cross-dipole radiating elements, may have broader beam width (which improves scanning), and may exhibit better impedance matching (and hence have a broader bandwidth). In addition, the use of a smaller number of metallized polymer (e.g., plastic) parts may provide significant cost and assembly advantages.

This patch carrier 10' includes a linear array of metal patches 12 on a forward-facing surface thereof and a corresponding linear array of feed signal pedestals 18 on an underside surface 10*c*. As highlighted by FIG. 8, four (4) feed signal lines 22, with arcuate-shaped distal ends 22*a*, are provided on each of the feed signal pedestals 18, as described hereinabove with respect to FIGS. 10, 2 and 3.

As shown best by FIG. 6A, a forward-facing surface 30*a* of the feed signal network 30' is illustrated as including a plurality of groups of through-holes 32, which correspond to the through-holes 32*a*-32*d* of FIGS. 1A and 4A. And, as shown best by FIG. 6B, a rear-facing surface 30*b* of the feed signal network 30' is illustrated as including a plurality of groups of patterned metal traces 34, which correspond to the metal traces 34*a*-34*d* of FIGS. 1B and 4B. Thus, upon assembly of the elongate patch carrier 10' and the 4-chamber support frame 20' of FIG. 7 on the feed signal network 30', the feed signal lines 22 become electrically connected to corresponding ones of the metal traces 34*a*-34*d* within the respective groups of metal traces 34 on the rear-facing surface 30*b*.

Figure 9:
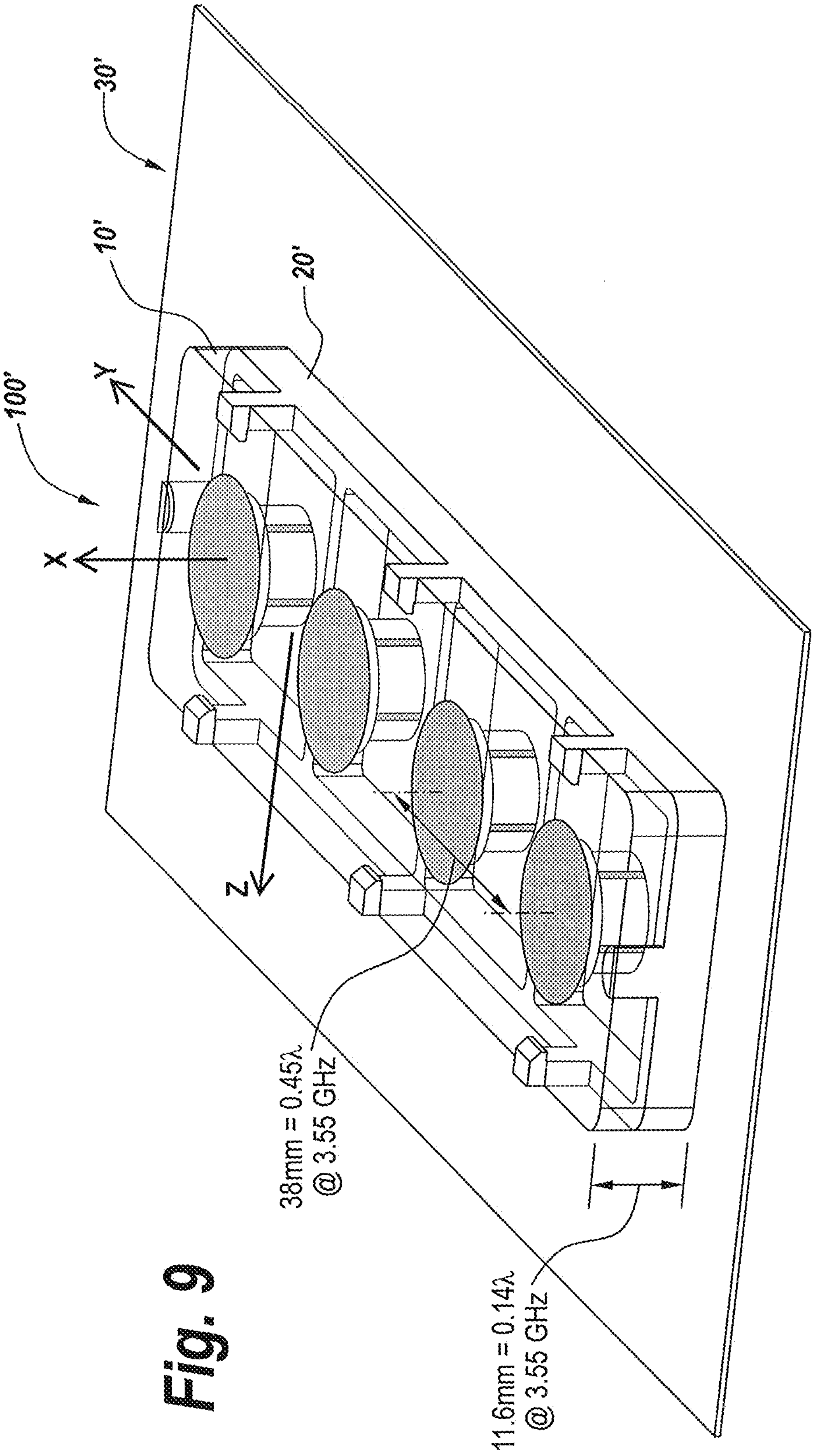
FIG. 9 is a perspective view of the three-piece patch-type antenna array of FIGS. 6A-6B, 7 and 8, as assembled, where the x-z directions designate the elevation plane and the x-y directions designate the azimuth plane.
Figure 10:
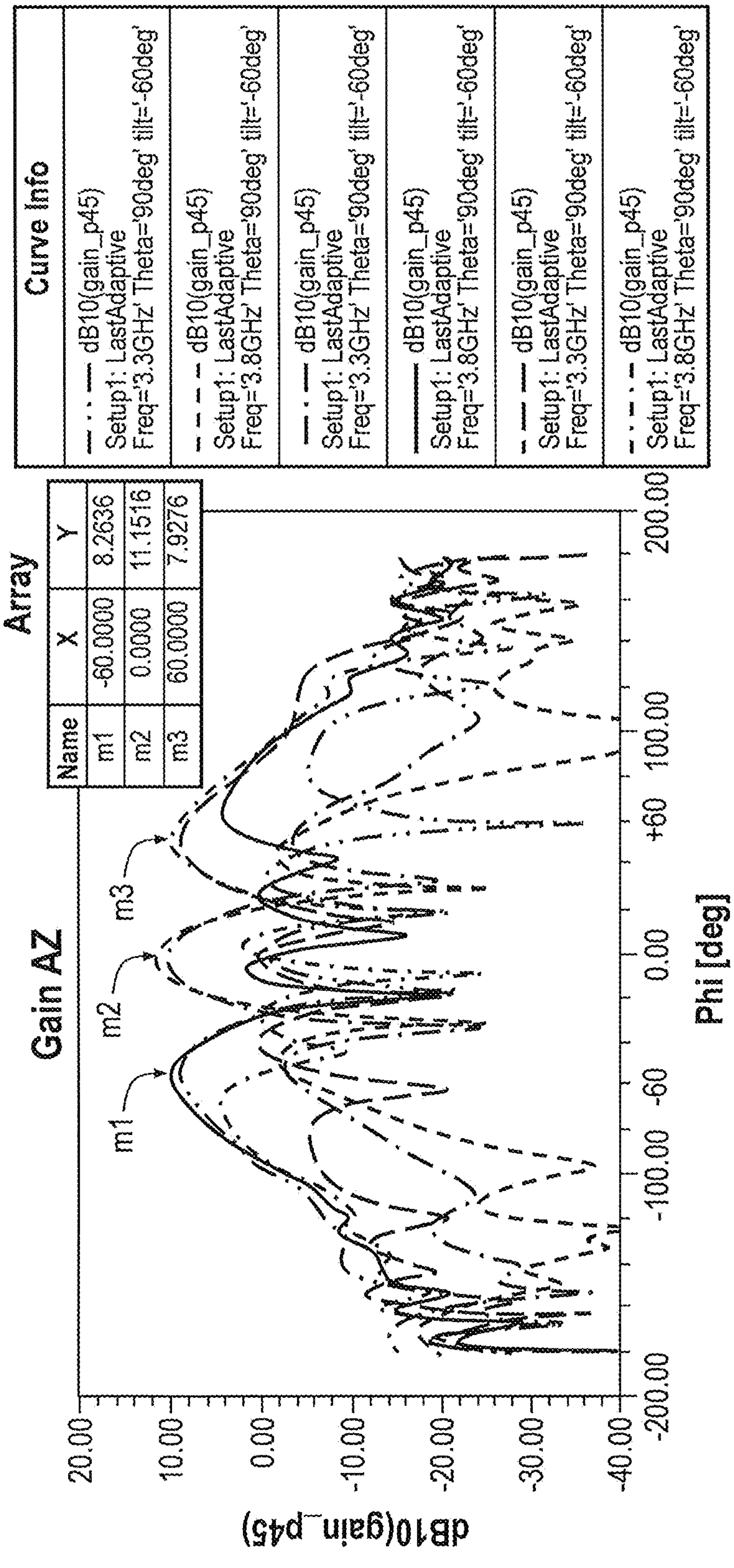
FIG. 10 is a side cross-sectional view of the three-piece patch-type radiating element of FIG. 1A, taken along a plane 1A-1A'.

Moreover, as shown by FIG. 9, an assembled patch antenna array 100' according to an embodiment of the invention may be configured so that: (i) a pitch between the plurality of metal patches 12 is less than 1.0λ, but more preferably in a range from about 0.43λ to about 0.47λ, (ii) a stack height of the patch carrier 10' and the multi-chambered support frame 20' is less than 0.25λ, but more preferably in a range from about 0.12λ to about 0.16λ, and (iii) a diameter of the plurality of metal patches 12 is less than 0.5λ, but more preferably in a range from about 0.23λ to about 0.27λ, where A corresponds to a wavelength of a radio frequency (RF) signal (in air) having a frequency of 3.55 GHz. Referring now to FIG. 10, a graph of the gain pattern in the azimuth plane for the patch-type antenna array 100' of FIG. 9 (on a ground plane 30*a* of 4.4λ×2.4λ) is provided, which illustrates a peak-gain ranging from 7.9276 dB to 11.1516 dB (i.e., a ΔGain=3.224 dB), across an operation band of 3.3 GHz to 3.8 GHz, and over a full scan range from −60° to +60° in the azimuth plane.

Figure 11A:
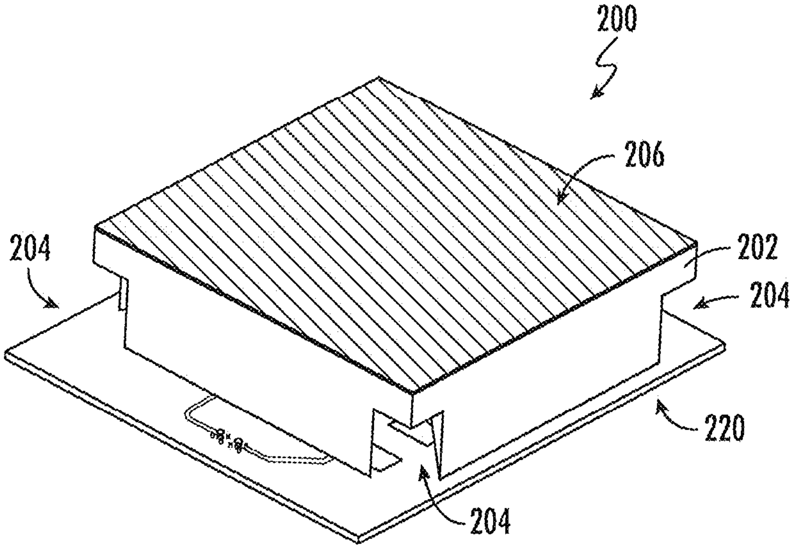
FIG. 11A is a perspective view of a patch antenna, which includes a patch radiating element and patch carrier mounted on a cross-polarized feed signal network, according to an embodiment of the invention.

Referring now to FIG. 11A, a patch antenna 200 according to another embodiment of the invention is illustrated as including a single-piece patch carrier 202 having multiple open-ended, rectangular-shaped, cavities 204 therein and a patch radiating element 206 (e.g., metallized patch) thereon. In some of these embodiments, the patch carrier 202 may be formed from a material having a relatively high dielectric constant, such as a polyphenylene ether (PPE), which has a Dk=8 and a density of 2.1 g/ml. Although not wishing to be bound by any theory, for patch antennas, a relatively high Dk value can facilitate size reduction, which may be a dominant consideration, whereas a lower Dk value can facilitate broader bandwidth. As shown, the patch carrier 202 is mounted on a cross-polarized feed signal network 220, which is configured to convert first and second radio frequency (RF) input feed signals into first and second pairs of cross-polarized feed signals at respective first and second pairs of feed signal output ports, as described more fully hereinbelow with respect to FIGS. 13A-13F.

Figure 11B:
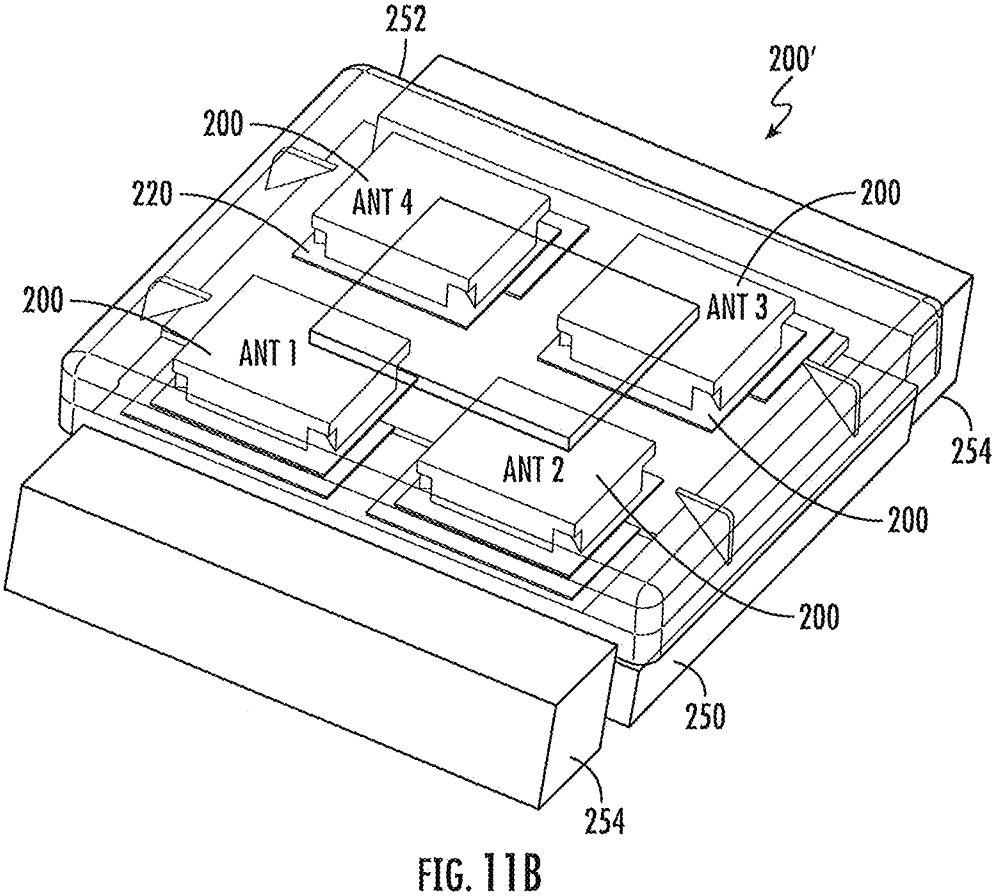
FIG. 11B is a perspective view of a 2×MIMO wideband patch antenna, which includes a quad arrangement of the patch antennas of FIG. 11A, according to an embodiment of the invention.
Figure 12A:
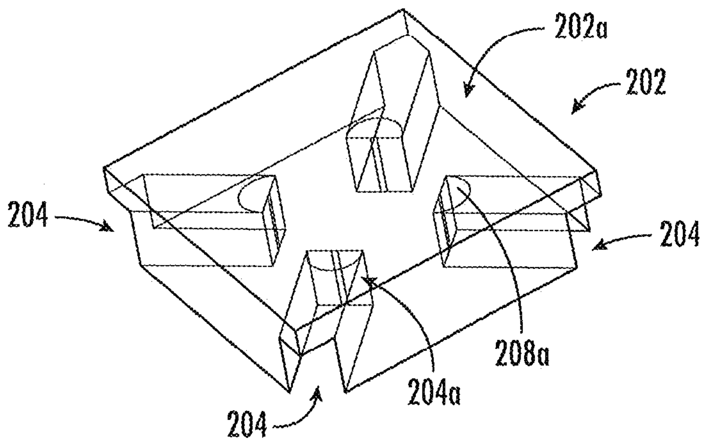
FIG. 12A is a perspective view of a patch carrier, which may be used in the patch antenna of FIG. 11A, according to an embodiment of the invention.
Figure 12B:
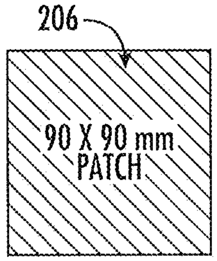
FIG. 12B is a plan view of a patch radiating element, which may be used in the patch antenna of FIG. 11A, according to an embodiment of the invention.
Figure 12C:
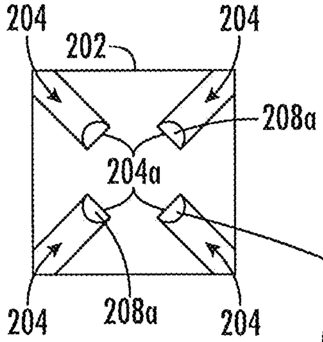
FIG. 12C is a top-down plan view of the patch carrier of FIG. 12A.
Figure 12D:
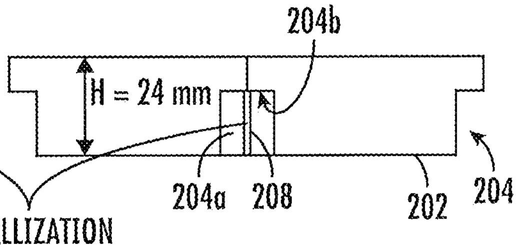
FIG. 12D is a side perspective view of the patch carrier of FIG. 12A.

Referring now to FIG. 11B, a 2×MIMO wideband patch antenna 200' is illustrated as including a quad-arrangement of the patch antenna 200 of FIG. 11A (i.e., Ant1-Ant 4), which is: (i) mounted on a chassis 250 containing digital and RF circuitry therein, (ii) enclosed by a radome 252, and (iii) cooled by a pair of fan tubes 254. Although not wishing to be bound by any theory, the patch antenna 200' may be configured to support an isolation (ISO) of less than −20 dB (between patch antennas 200) throughout the entire −4 dB return loss (RL) bandwidth of greater than about 12% at a center frequency $f_0$=663.3 MHz. These characteristics are suitable for a 2×MIMO application with an antenna-to-antenna pitch of 0.31λ, as shown by FIG. 11B, and even a maximum 6×MIMO in some applications. In this 2×MIMO antenna 200', each patch antenna 200 may have electrical dimensions (L×W×H) of 0.2λ×0.2λ×0.053λ at the center frequency $f_0$. Moreover, when operating as part of a transmitter on a base-station side, an antenna 200 (e.g., Ant1) generates two polarized signals (e.g., Tx1_+45/−45), if a remote UE (user equipment) has four (4) independent receiving antennas, a 2×4 MIMO system can be constructed. And, when Ant1-Ant4 are operating in the same frequency band, and the UE antennas are operating in the same frequency band, an 8×4 MIMO system can be constructed. Alternatively, Ant1-Ant4 may operate at different frequency bands, with each Ant creating a 2×MIMO system.

Referring now to FIGS. 12A-12D, the patch carrier 202 is illustrated as a square dielectric block (90×90 mm) of predetermined height (e.g., 24 mm), which contains an open-ended cavity 204 at each of the four corners thereof. In addition, the patch radiating element 206 is provided as a planar metallization layer that covers an entirety of a forward facing surface 202*a* of the patch carrier 202. As shown, each cavity 204 is defined by a ceiling 204*b*, which extends parallel to the patch radiating element 206, and an innermost sidewall 204*a*, which extends back-to-back relative to an opposing innermost sidewall 204*a* of an opposing cavity 204 extending inwardly from an opposite corner. As further shown by FIGS. 12C-12D, a respective metal feed signal line 208 is patterned on (and extends the full height of) each of the innermost sidewalls 204*a*, and terminates at a semi-circular distal end 208*a* on each ceiling 204*b*. In some embodiments of the invention, the height of each of the cavities relative to a rear facing surface of the patch carrier 202 may be in a range from about 75-85% of the height of the carrier 202 (i.e., 18-20 mm for a carrier height of 24 mm) for proper tuning.

Referring now to FIGS. 13A-13F, the cross-polarized feed signal network 220 is illustrated as a multi-layer printed circuit board (PCB) containing two dielectric layers 224*a*, 224*b* and three (3) metallization layers. The three metallization layers include a forward facing ground plane layer 222*a*, a rear facing ground plane layer 222*c* and an intermediate layer 222*b*, which is patterned as a feed signal routing circuit that functions (between the ground plane layers 222*a*, 222*c*) as first and second strip feed line routing circuits 234*a*, 234*b* for respective cross-polarized RF input feed signals (+45°, −45°).

Figure 13A:
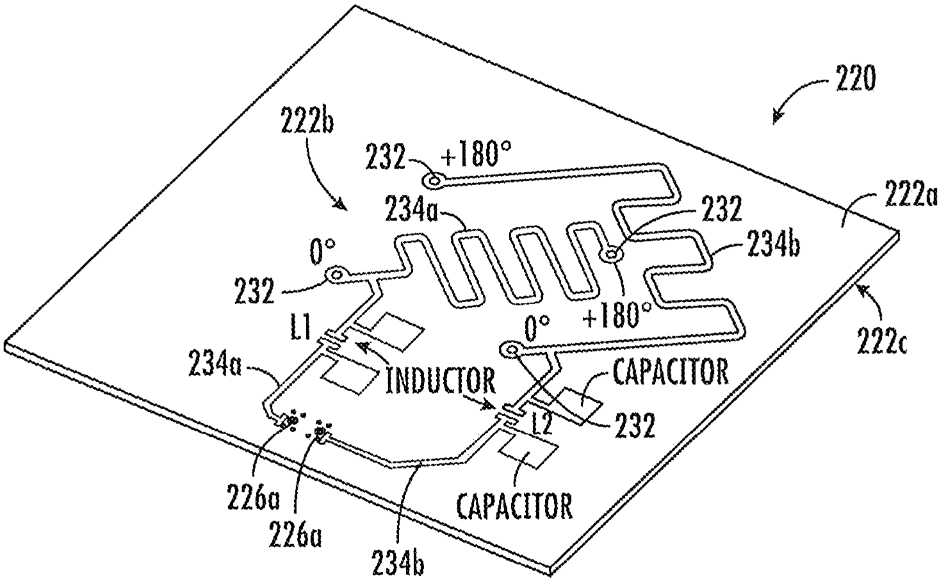
FIG. 13A is a perspective view of a cross-polarized feed signal network, which may be used in the patch antenna of FIG. 11A, according to an embodiment of the invention.
Figure 13B:
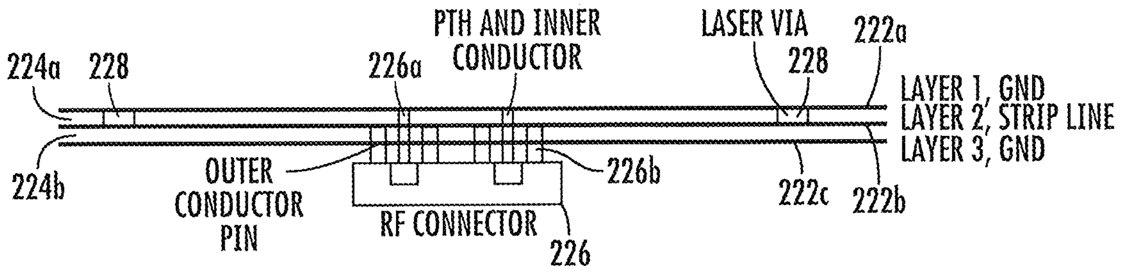
FIG. 13B is a side perspective view of the cross-polarized feed signal network of FIG. 13A.
Figure 13C:
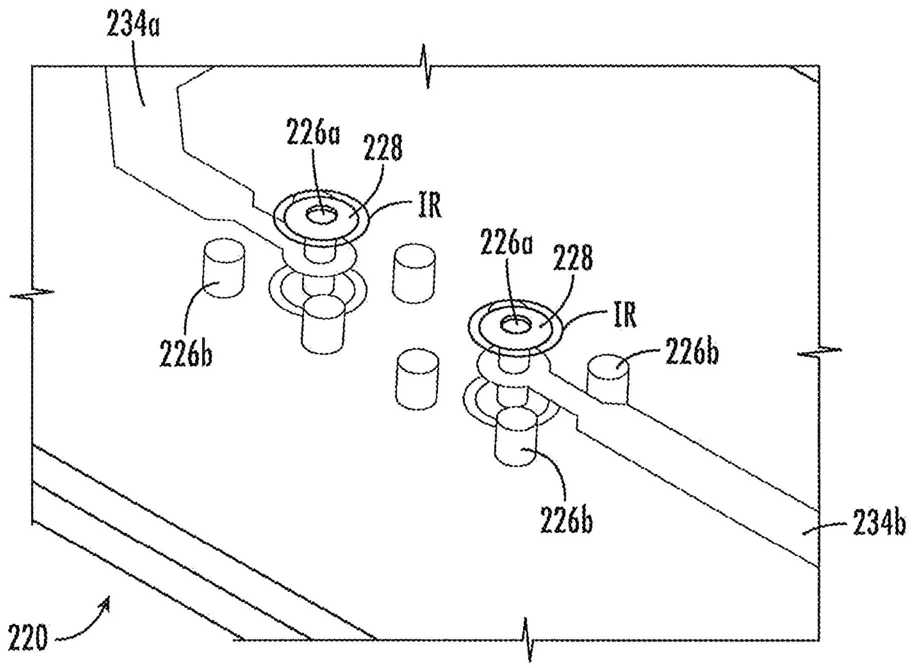
FIG. 13C is a perspective view of a portion of the cross-polarized feed signal network of FIG. 13A, which illustrates electrical connections between a rear-side RF connector and first and second RF input feed signal ports (with forward facing ground plane metallization omitted for clarity), according to an embodiment of the invention.
Figure 13D:
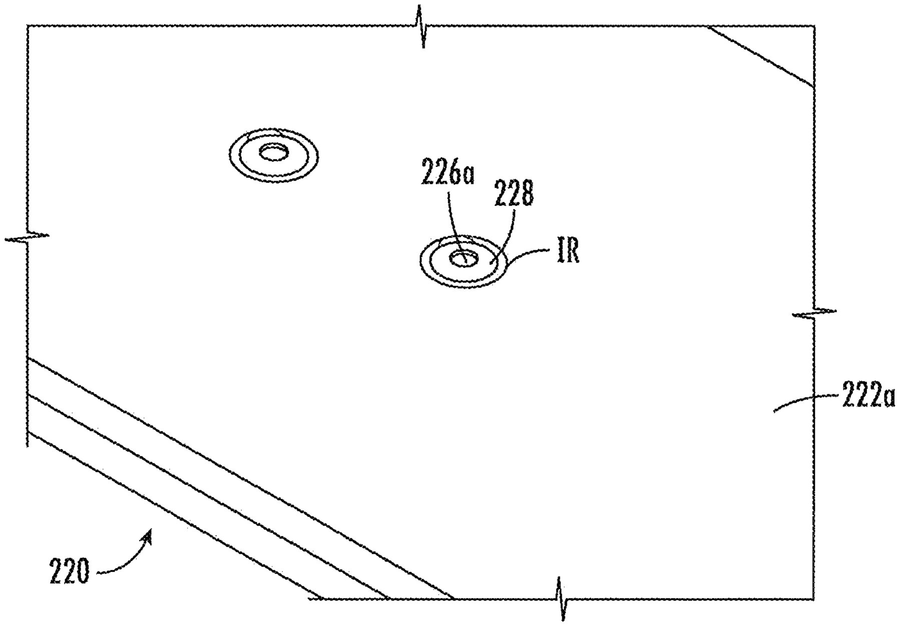
FIG. 13D is a perspective view of a portion of a forward facing surface of the cross-polarized feed signal network of FIGS. 13A and 13C.
Figure 13E:
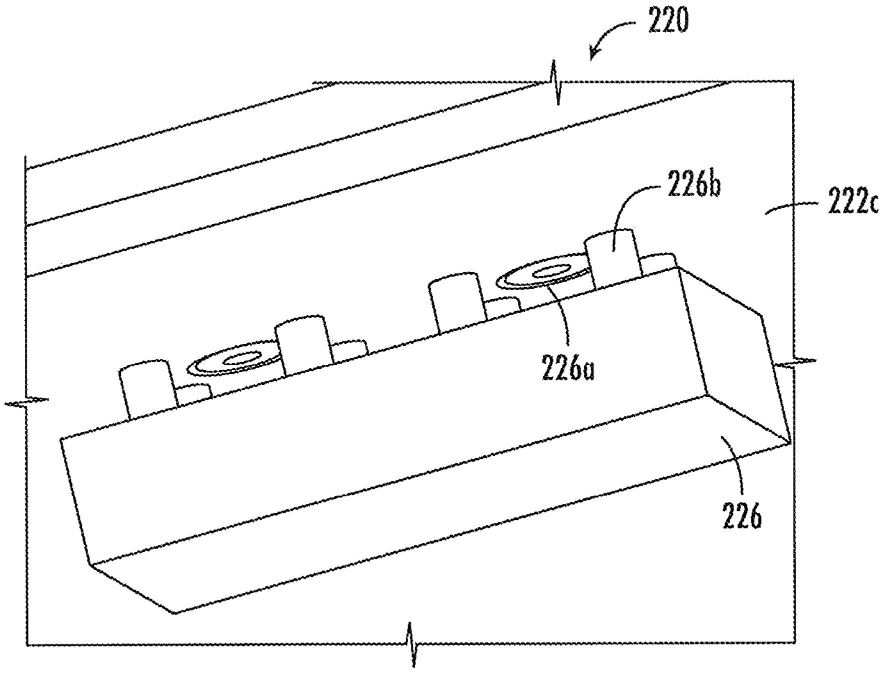
FIG. 13E is a perspective view of a portion of a rear facing surface of the cross-polarized feed signal network of FIGS. 13A-130.
Figure 13F:
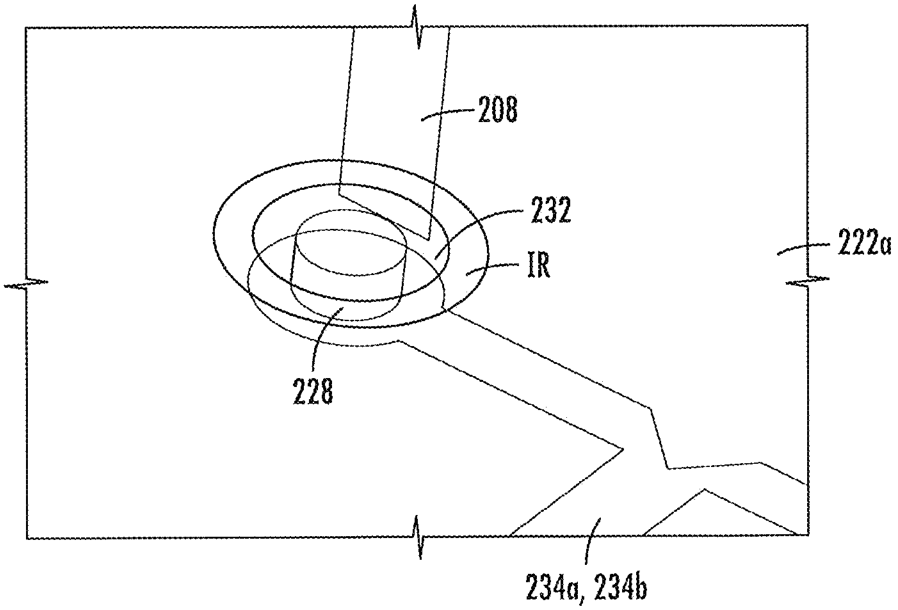
FIG. 13F is a perspective view of a portion of the forward facing surface of the cross-polarized feed signal network of FIG. 13A, which shows an electrical connection between a proximal end of a feed signal line (within a patch carrier) and a feed signal output port.

As shown by FIG. 13A, the intermediate metallization layer 222*b* is patterned as the first and second strip feed line routing circuits 234*a*, 234*b*. The first strip feed line routing circuit 234*a* receives a first RF input feed signal (e.g., FEED1, +45°) at a port, and from a first center conductor 226*a* of a rear-mounted RF connector 226. As shown by FIGS. 13B-13D, this first center conductor 226*a* terminates with an electrically conductive ring 228 on the forward facing surface of the PCB, which is spaced from the forward facing ground plane layer 222_a_ by an electrically insulating ring IR, which is free of metallization. And, as shown best by FIGS. 13B-13C and 13E, the RF connector 226 further includes a quad-arrangement of outer conductor pins 226_b_, which use a quad-arrangement of plated through holes to secure the RF connector 226 to the PCB and electrically connect the pins 226_b_ to the ground plane layers 222_a_, 222_c_.

The first strip feed line routing circuit 234_a_ also includes transmission line equivalents of lumped inductor (L) and capacitor (C) elements of an LC circuit. In particular, the first RF input feed signal passes through a first serpentine-shaped inductor L1, which is connected at both ends thereof to respective capacitor electrodes, which are sandwiched between the ground plane layers 222_a_, 222_c_. After the first inductor L1, the first RF input feed signal passes through a meandering portion of the first strip feed line routing circuit 234_a_ to thereby generate a pair of feed signals, which are phase delayed relative to each other (e.g., 0°, 180°). As shown best by FIGS. 13B and 13F, this pair of feed signals then pass vertically through filled/plated through-hole (PTH) vias 228 to a corresponding pair of output ports (e.g., metallized contact pads 232) on the forward facing surface of the PCB. In some embodiments of the invention, these contact pads 232 may be solder bonded to corresponding feed signal lines 208 within the patch carrier 202. Alternatively, contact pads may be provided, which enable relatively large area capacitively coupling to the feed signal lines 208, as explained more fully hereinbelow with respect to FIGS. 15A-15D.

Similarly, the second strip feed line routing circuit 234_b_ receives a second RF input feed signal (e.g., FEED2, −45°) at a port, and from a corresponding first center conductor 226_a_ of the rear-mounted RF connector 226. The second RF input feed signal then passes through a second serpentine-shaped inductor L2 of an LC circuit. After the second inductor L2, the second RF input feed signal passes through a meandering portion of the second strip feed line routing circuit 234_b_ to thereby generate a corresponding pair of feed signals. This pair of feed signals then pass vertically through filled/plated through-hole (PTH) vias 228 to a corresponding pair of metallized contact pads 232, which operate as feed signal output ports on the forward facing surface of the PCB that can be solder bonded to corresponding feed signal lines 208 within the patch carrier 202.

Figure 14:
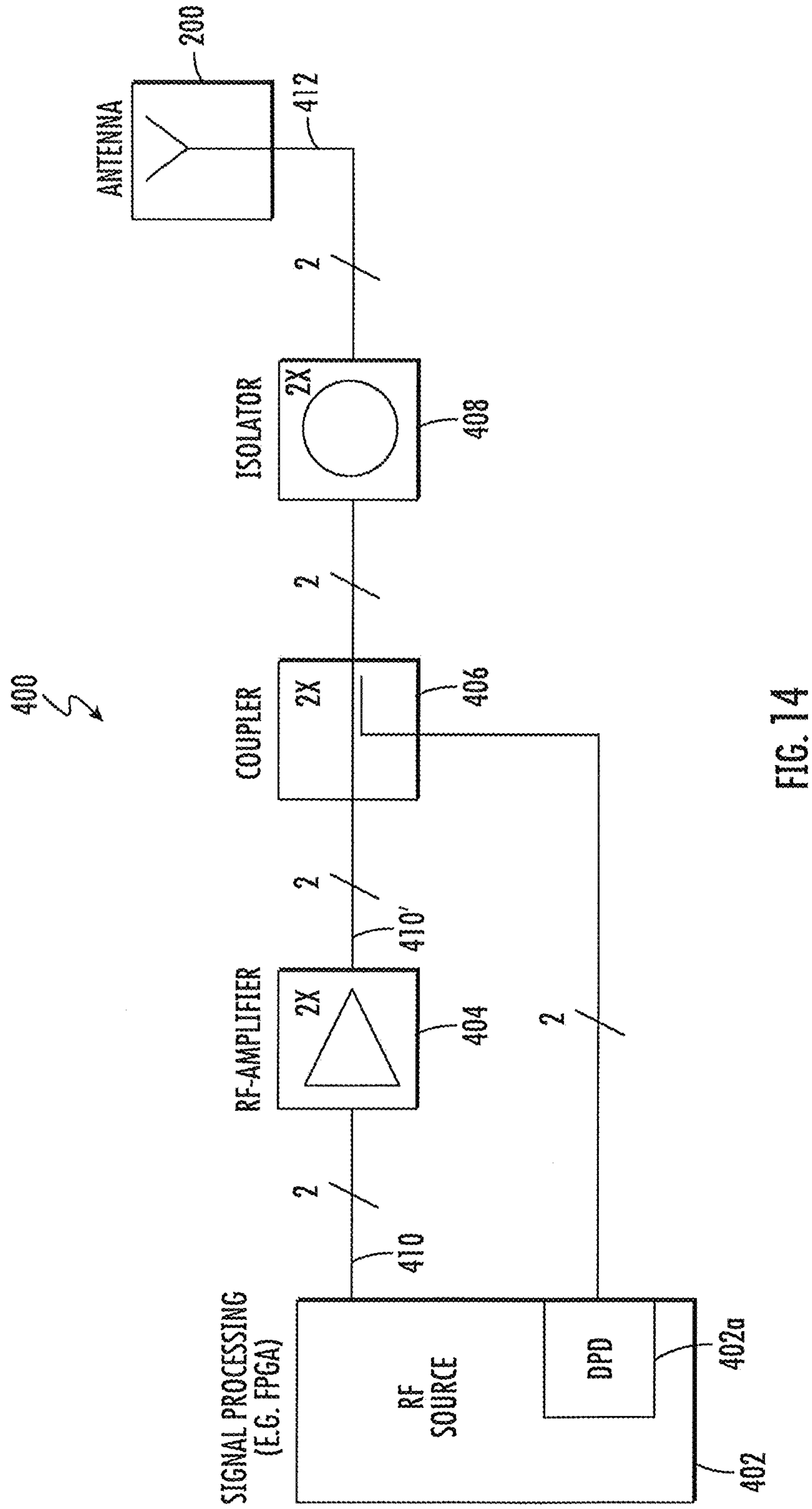
FIG. 14 is a block electrical schematic of an antenna with RF signal generator circuitry, according to an embodiment of the invention.

Referring now to FIG. 14, an antenna system 400 according to another embodiment of the invention is illustrated as including an antenna 200, as described herein, which is responsive to first and second radio frequency (RF) input feed signals 412. As shown, these feed signals 412 are generated by a plurality of system components, which are electrically coupled in series in an RF signal path. These components include a digital signal processing circuit 402, which generates a pair of analog RF signals 410 to an RF-amplifier circuit 404. Upon amplification, the pair of analog RF signals 410' are provided to corresponding input terminals of a coupler circuit 406, which splits off and feeds back a portion of the amplified RF signals to a digital predistortion (DPD) circuit 402_a_ within the processing circuit 402. Although not wishing to be bound by any theory, the DPD circuit 402_a_ operates to "linearize" the RF-amplifier circuit 404 by using signal feedback to dynamically manipulate the pair of analog RF signals 410 and thereby support relatively interference-free transmission of the amplified RF signals 410' using a non-linear, but power efficient, RF-amplifier circuit 404. In addition, the main RF signal path and performance of the DPD circuit 402_a_ are protected against the potentially low return loss associated with the antenna 200 by including an isolator circuit 408 (e.g., circulator) between the coupler circuit 406 and its potentially mismatched load (i.e., antenna 200).

Figure 15A:
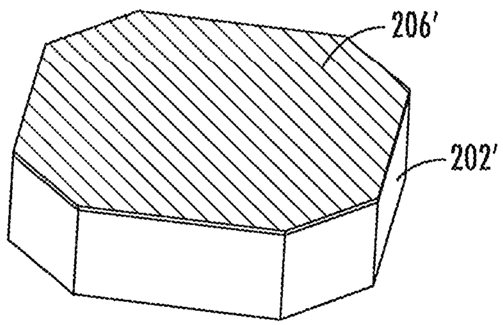
FIGS. 15A-15D are perspective views of elements of a patch radiating element with capacitive feed signal coupling, according to an embodiment of the invention.
Figure 15B:
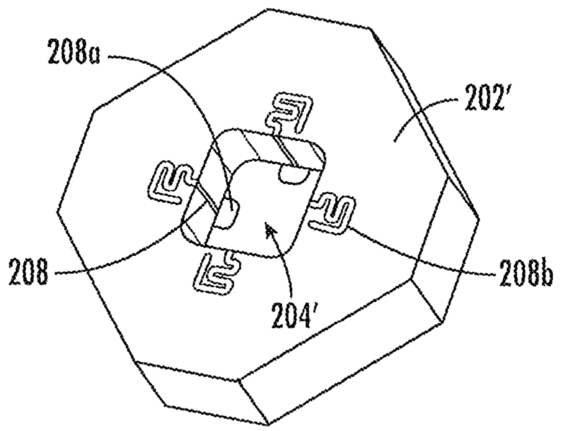
Figure 15C:
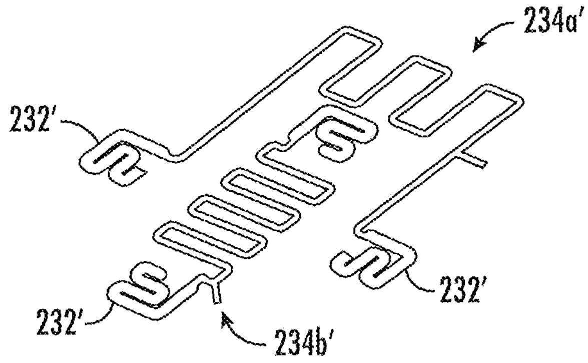
Figure 15D:
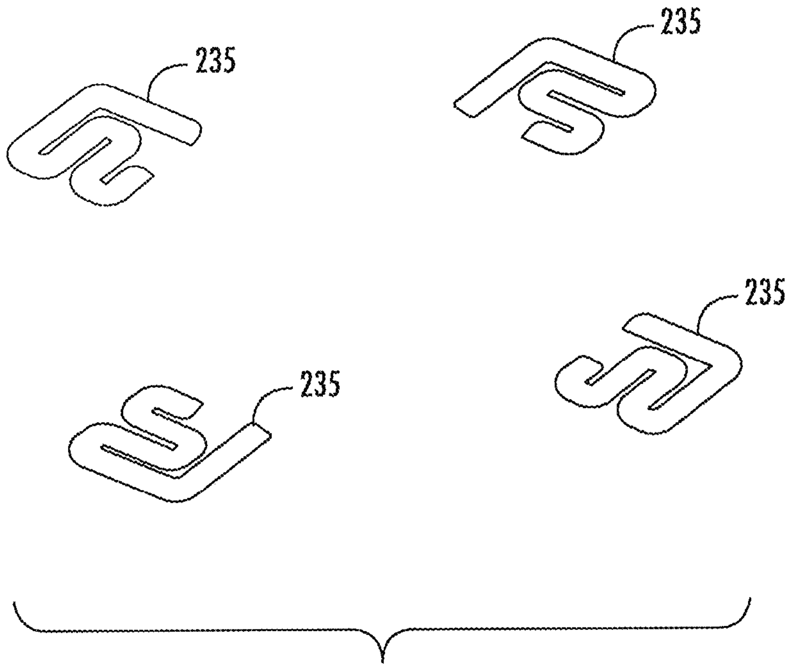

Referring now to FIGS. 15A-15D, a cross-polarized antenna according to another embodiment of the invention is illustrated as including an 8-sided dielectric patch carrier 202' having a corresponding patch radiating element 206' thereon and a single cavity 204' that is centrally located therein. Like the embodiment of the patch carrier 202 of FIGS. 12A-12D, the feed signal lines 208 of FIG. 15B have distal ends 208_a_, which are semi-circular in shape. However, as shown by FIG. 15B, proximal ends of the feed signal lines 208 extend as a quad arrangement of serpentine-shaped patterns 208_b_ (or other equivalent large area patterns) on a rear-facing surface of the patch carrier 202'. Advantageously, as shown by FIGS. 15C-15D, these serpentine-shaped patterns 208_b_ support "solder-free" RF capacitive coupling to opposing serpentine-shaped pads 232', which can be covered in dielectric solder resist patterns 235 and terminate corresponding first and second feed line routing circuits 234_a_', 234_b_' associated with a cross-polarized feed signal network and PCB (not shown).

Figure 16A:
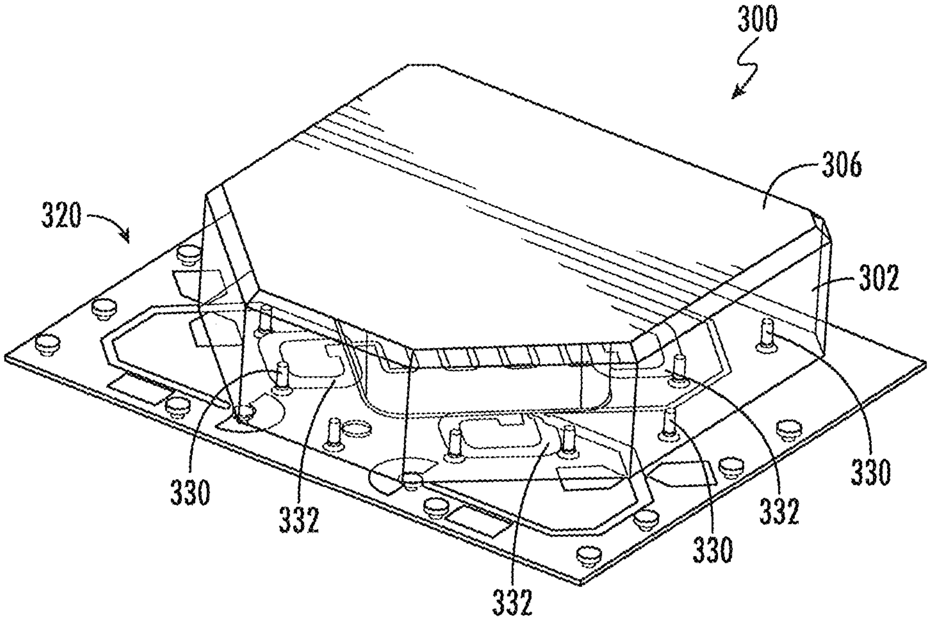
Figure 16B:
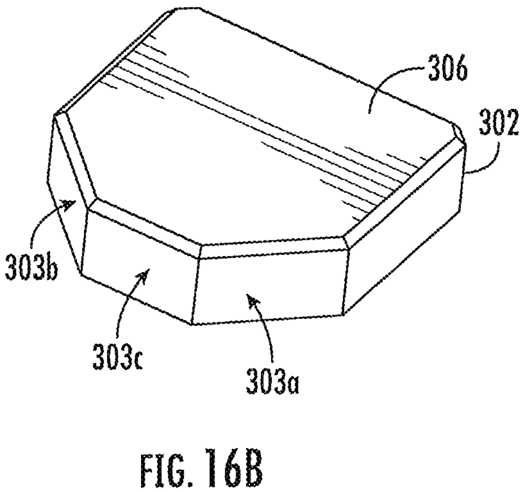
Figure 17:
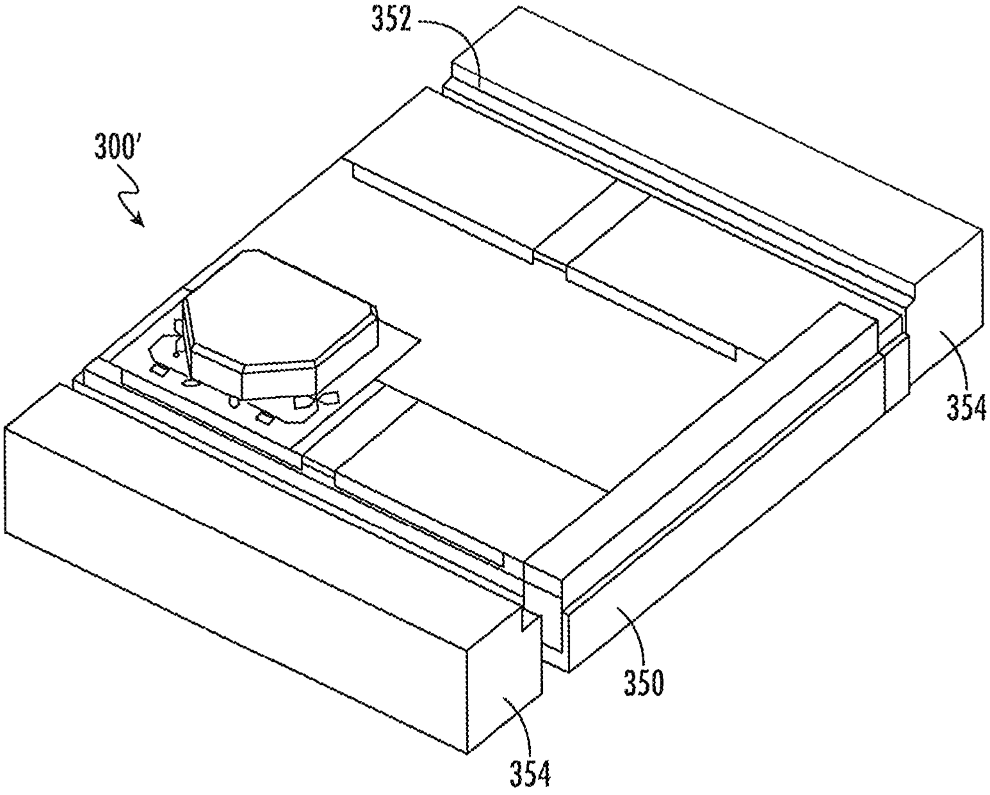
FIG. 17 is a perspective view of a wideband antenna, which includes the patch radiating antenna of FIGS. 16A-160, according to an embodiment of the invention.

Referring now to FIGS. 16A-160, a patch antenna 300 according to another embodiment of the invention is illustrated as including a single-piece, essentially six-sided, patch carrier 302 (e.g., a polyphenylene ether (PPE) carrier) having a single interior cavity 304 therein and patch radiating element 306 thereon, which may comprise a metal (e.g., copper). In some embodiments of the invention, a longest dimension of the patch carrier 302 on one side may be "X" mm (e.g., 90 mm), and plan layout of the carrier 302 may fit within an X-by-X square. Accordingly, as shown, one side of the patch carrier 302 may be truncated to have three (3) sides, including two angled sides 303_a_, 303_b_, and one flat side 303_c_ that may be spaced from an opposing flat side by a distance of "X" mm. Although not wishing to be bound by any theory, this "truncated" patch carrier 302 (and corresponding radiating element 306) may support a high degree of isolation when utilized in an environment having an unbalanced underlying ground plane and supporting chassis, such as the patch antenna 300' of FIG. 17. This patch antenna 300' includes a chassis 350 containing digital and RF circuitry therein. The chassis 350 is enclosed by a radome 352, and cooled by a pair of fan tubes 354, as further illustrated and described hereinabove with respect to FIG. 11B.

Figure 16C:
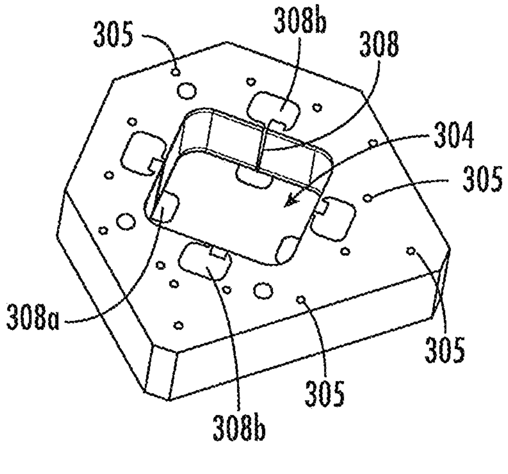

The patch carrier 302 is mounted on a cross-polarized feed signal network 320 (e.g., dual-sided PCB), which is configured to convert first and second radio frequency (RF) input feed signals into first and second pairs of cross-polarized feed signals at respective first and second pairs of feed signal output ports. In some embodiments of the invention, the first and second pairs of feed signal output ports may be configured to include a quad-arrangement of generally rectangular-shaped metal pads 332, which may be covered by dielectric solder resist (not shown) to thereby support "solder-free" RF capacitive coupling to opposing metal pads 308_b_, which extend on a rear facing surface of the patch carrier 302, as shown by FIG. 16C.

The metal pads 308_b_ are electrically connected to proximal ends of corresponding feed signal lines 308, which are terminated, at distal ends thereof, by semi-circular metal patterns 308_a_ on an interior ceiling of the cavity 304. The rear facing surface of the patch carrier 302 may also include a plurality of alignment holes 305 therein, which, upon assembly, matingly receive corresponding alignment posts 330 on a forward-facing surface of the feed signal network 320.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An antenna, comprising:

a patch carrier having a plurality cavities therein, and a plurality of feed signal lines within the plurality of cavities;

a patch radiating element on said patch carrier, said patch radiating element capacitively coupled to the plurality of feed signal lines; and a cross-polarized feed signal network configured to convert first and second radio frequency (RF) input feed signals into first and second pairs of cross-polarized feed signals at respective first and second pairs of feed signal output ports;

wherein the patch carrier comprises a substrate having the plurality of cavities within the substrate;

wherein the plurality of feed signal lines include first and second pairs of feed signal lines, which extend on sidewalls of the plurality of cavities;

wherein the patch radiating element is capacitively coupled to the first and second pairs of feed signal lines; and wherein the first and second pairs of feed signal lines are electrically coupled to corresponding ones of the first and second pairs of feed signal output ports.

2. The antenna of claim 1, wherein the plurality of cavities have respective closed and open ends; and wherein the closed end of each of the plurality of cavities includes a corresponding one of the first and second pairs of feed signal lines thereon.

3. The antenna of claim 2, wherein each of the plurality of cavities includes a ceiling upon which a distal end of a corresponding one of the first and second pairs of feed signal lines extends.

4. The antenna of claim 1, wherein said cross-polarized feed signal network includes a strip feed line routing circuit embedded therein.

5. The antenna of claim 1, wherein said patch radiating element is capacitively coupled to distal ends of the first and second pairs of feed signal lines; and wherein the first and second pairs of feed signal lines electrically contact or are capacitively coupled to the first and second pairs of feed signal output ports.

6. The antenna of claim 1, wherein the plurality of cavities include: (i) a first pair of cavities having first and second open ends on respective first and second opposing sides of the substrate, and (ii) a second pair of cavities having third and fourth open ends on respective third and fourth opposing sides of the substrate.

7. The antenna of claim 6, wherein the substrate is rectangular-shaped substrate; and wherein the first through fourth open ends are located at respective first through fourth corners of the substrate.

8. The antenna of claim 7, wherein the first pair of cavities extend inwardly from diametrically opposite corners of the substrate and terminate at a first pair of innermost sidewalls; and wherein the second pair of cavities extend inwardly from diametrically opposite corners of the substrate and terminate at a second pair of innermost sidewalls.

9. The antenna of claim 8, wherein the first pair of innermost sidewalls are aligned back-to-back and the second pair of innermost sidewalls are aligned back-to-back.

10. The antenna of claim 8, wherein said patch radiating element is capacitively coupled to distal ends of the first and second pairs of feed signal lines, which extend along corresponding ones of the first and second pairs innermost sidewalls.

11. The antenna of claim 10, wherein the distal ends of the first and second pairs of feed signal lines are semi-circular in shape.

12. The antenna of claim 11, wherein the distal ends of the first and second pairs of feed signal lines extend on corresponding ceilings within the first and second pairs of cavities and parallel to the patch radiating element.

13. The antenna of claim 10, wherein the distal ends of the first and second pairs of feed signal lines extend on corresponding ceilings within the first and second pairs of cavities and parallel to the patch radiating element.

14. The antenna of claim 1, wherein the patch radiating element is square-shaped; and wherein each of the plurality of cavities is rectangular-shaped.

15. The antenna of claim 1, wherein the cross-polarized feed signal network comprises a multi-layered printed circuit board (PCB); and wherein an intermediate layer of the multi-layered PCB includes a feed signal routing circuit, which is configured to convert the first and second RF input feed signals into the first and second pairs of cross-polarized feed signals.

16. The antenna of claim 15, wherein the feed signal routing circuit is a strip feed line routing circuit.

17. The antenna of claim 16, wherein the feed signal routing circuit includes a first LC circuit responsive to the first RF input feed signal, and a second LC circuit responsive to the second RF input feed signal.

18. An antenna, comprising:

a patch carrier including a plurality cavities and first and second pairs of feed signal lines extending on respective sidewalls of the plurality of cavities;

a patch radiating element on said patch carrier, said patch radiating element capacitively coupled to the first and second pairs of feed signal lines; and a cross-polarized feed signal network configured to convert first and second radio frequency (RF) input feed signals into first and second pairs of cross-polarized feed signals at respective first and second pairs of feed signal output ports, which are electrically coupled to corresponding ones of the first and second pairs of feed signal lines.

19. The antenna of claim 18, wherein the plurality of cavities have respective closed and open ends; and wherein the closed end of each of the plurality of cavities includes a corresponding one of the first and second pairs of feed signal lines thereon.

20. The antenna of claim 19, wherein each of the plurality of cavities includes a ceiling upon which a distal end of a corresponding one of the first and second pairs of feed signal lines extends; and wherein the first and second pairs of feed signal output ports directly contact or are capacitively coupled to said corresponding ones of the first and second pairs of feed signal lines.

* * * * *